United States Patent [19]
Hellmann

[11] Patent Number: 5,982,387
[45] Date of Patent: Nov. 9, 1999

[54] HINT ASSIGNMENT METHOD AND FONT FILE CONSTRUCTION METHOD

[75] Inventor: Antonius Hellmann, München, Germany

[73] Assignee: Fujitsu Limited, Kawasaki, Japan

[21] Appl. No.: 08/688,847

[22] Filed: Jul. 25, 1996

[30] Foreign Application Priority Data

Nov. 9, 1995 [JP] Japan ................................... 7-290702

[51] Int. Cl.⁶ ............................................... G06T 11/00
[52] U.S. Cl. ........................ 345/469; 345/468; 345/947; 345/948; 345/467
[58] Field of Search .................................. 345/469, 947, 345/948, 468, 467

[56] References Cited

U.S. PATENT DOCUMENTS

| | | | |
|---|---|---|---|
| 4,627,002 | 12/1986 | Blum et al. ........................ | 345/947 X |
| 5,280,577 | 1/1994 | Trevett et al. ......................... | 345/469 |
| 5,598,520 | 1/1997 | Harel et al. ............................. | 345/469 |
| 5,714,987 | 2/1998 | Otsuka .................................... | 345/469 |
| 5,727,140 | 3/1998 | Ohtomo et al. ......................... | 345/467 |

OTHER PUBLICATIONS

Peter Karow, "Font Technology: Description and Tools", Springer–Verlag, 105–146, 1994.

*Primary Examiner*—Mark K. Zimmerman
*Assistant Examiner*—Chante' Harrison
*Attorney, Agent, or Firm*—Staas & Halsey

[57] ABSTRACT

A method of assigning hints for outline-font creation includes a first step of dividing elements having similar outlines into classes, a second step of learning hint assignment by storing hint information which prevails when a hint is assigned by operator operation to a predetermined position of an outline of a representative element (master element) of each class, and a third step of assigning hint information automatically to elements of the class, to which the master element belongs, using learned hint information of the master element.

21 Claims, 43 Drawing Sheets

FIG.7

| CONTOUR POINT | X Hint | Y Hint |
|---|---|---|
| $P_1$ |  | c |
| $P_2$ | as |  |
| $P_3$ | rs |  |
| --- | --- | --- |
| $P_i$ |  | m |
| --- | --- | --- |
| $P_n$ |  |  |

| ANGULAR RANGE | DIRECTION ID | DIRECTION |
|---|---|---|
| -10° ~ 10° | 0 | POSITIVE HORIZONTAL DIRECTION |
| 10° ~ 80° | 1 | UPPER-RIGHT DIRECTION |
| 80° ~ 100° | 2 | POSITIVE VERTICAL DIRECTION |
| 100° ~ 170° | 3 | UPPER-LEFT DIRECTION |
| 170° ~ 190° | 4 | NEGATIVE HORIZONTAL DIRECTION |
| 190° ~ 260° | 5 | LOWER-LEFT DIRECTION |
| 260° ~ 280° | 6 | NEGATIVE VERTICAL DIRECTION |
| 280° ~ 350° | 7 | LOWER-RIGHT DIRECTION |

FIG. 12

| NUMBER OF ATTRIBUTES = 7 | | | |
|---|---|---|---|
| ATTRIBUTE SEGMENT NO. | DIRECTION | STARTING POINT | END POINT |
| 1 | 7 | $P_{01}$ | $P_{03}$ |
| 2 | 6 | $P_{03}$ | $P_{05}$ |
| 3 | 7 | $P_{05}$ | $P_{06}$ |
| 4 | 0 | $P_{06}$ | $P_{08}$ |
| 5 | 1 | $P_{08}$ | $P_{09}$ |
| 6 | 2 | $P_{09}$ | $P_{11}$ |
| 7 | 3 | $P_{11}$ | $P_{00}$ |

| | Scan Lines Stroke 1 (MSTa) | Scan Lines Stroke 2 (MSTb) | Overlapping |
|---|---|---|---|
| y=3.5: | xs=0.0  xe=2.0 | xs=1.75  xe=2.0 | xs=1.75  xe=2.0 |
| y=2.5: | xs=0.0  xe=6.0 | xs=1.25  xe=8.0 | xs=1.25  xe=6.0 |
| y=1.5: | xs=0.0  xe=8.0 | xs=0.75  xe=8.0 | xs=0.75  xe=8.0 |
| y=0.5: | xs=0.0  xe=8.0 | xs=0.25  xe=8.0 | xs=0.25  xe=8.0 |
| sum: | 24.0 | 22.0 | 20.0 |
| normalized area : 20.0/(24.0+22.0)/2=0.87 | | | |

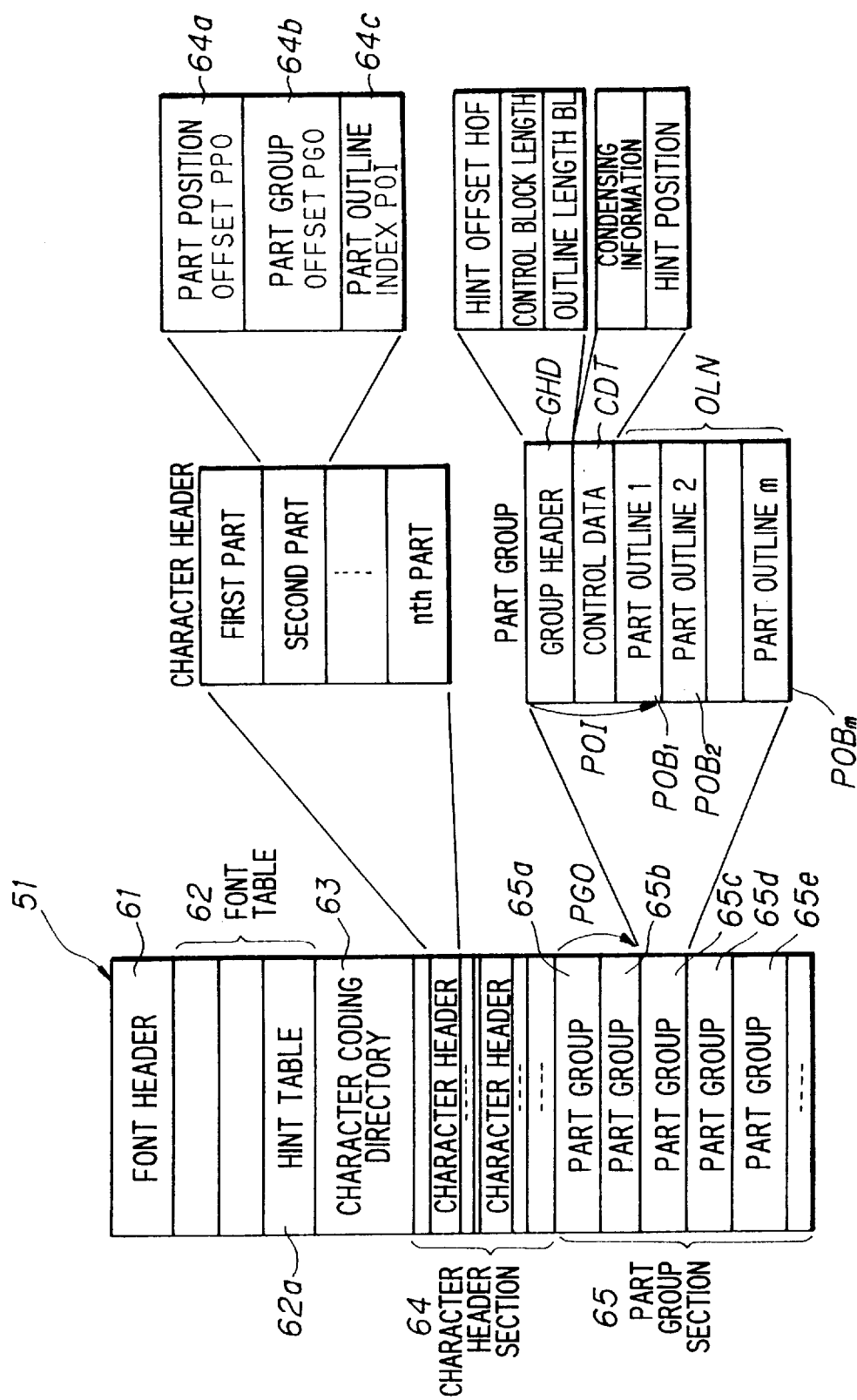

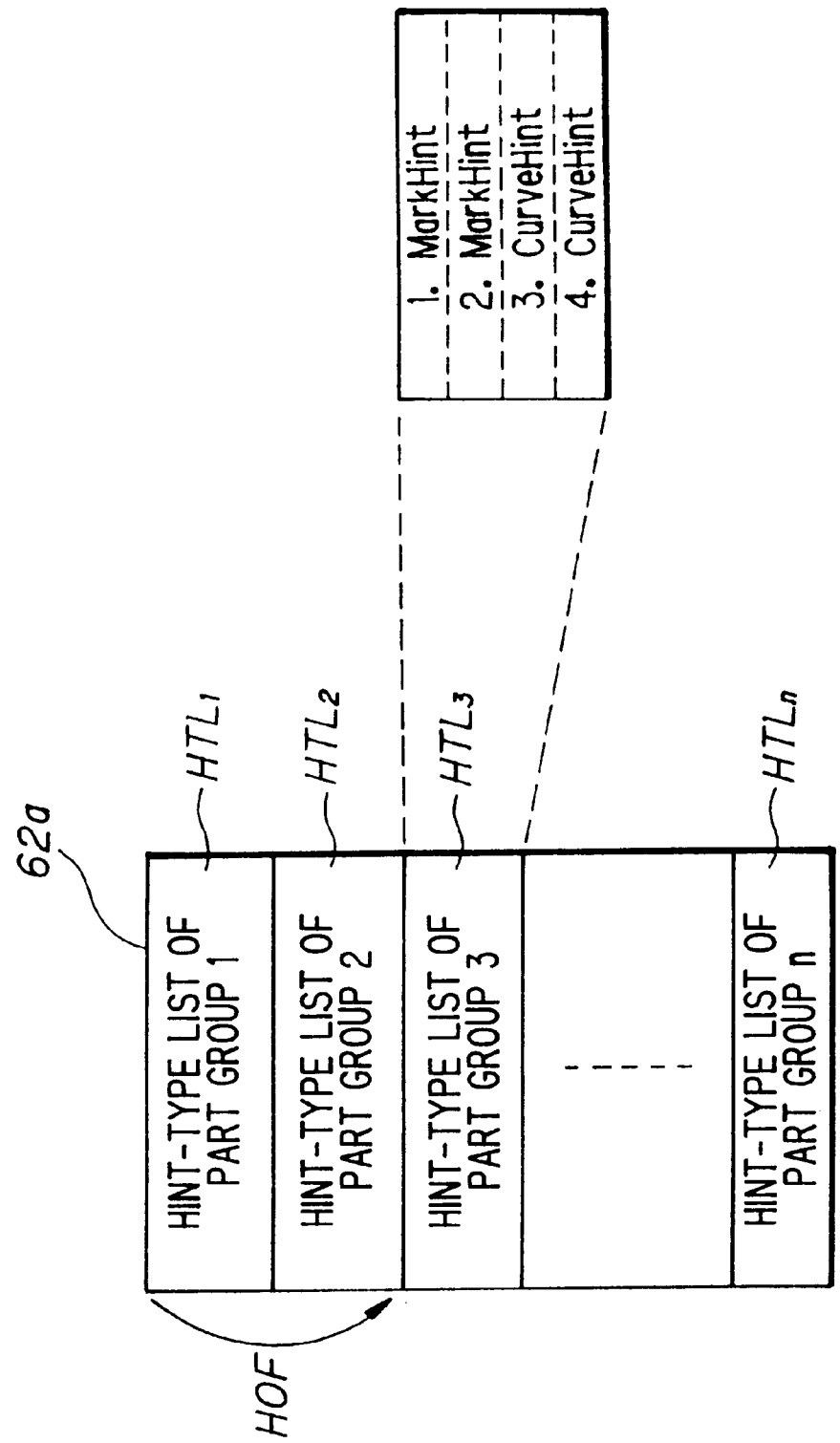

FIG. 31

| TYPE OF CONDENSING | dx-RANGE | dy-RANGE | SIZE OF CONDENSED OUTLINE (FOR SHORT-VECTOR NOTATION) |
|---|---|---|---|
| type0: | dx= 0 bit, | dy= 0 bit | 0Byte |
| type1: | dx= 4 bit, | dy= 4 bit | 1Byte |
| type2: | dx= 0 bit, | dy= 8 bit | 1Byte |
| type3: | dx= 8 bit, | dy= 0 bit | 1Byte |
| type4: | dx= 8 bit, | dy= 8 bit | 2Byte |
| type5: | dx=16 bit, | dy=16 bit | 4Byte |

HINT ASSIGNMENT METHOD AND FONT FILE CONSTRUCTION METHOD

BACKGROUND OF THE INVENTION

This invention relates to a method of assigning hints and a method of constructing a font file. More particularly, the invention relates to a hint assignment method and a font file construction method in outline font technology, wherein the outline of a character is cut into strokes or parts, the outline of each stroke or part (character element) is defined, a character is expressed by a collection of elements and, in outputting a character, the outline of a character element is developed into a bitmap image and then outputted.

The Japanese language, which employs three different character sets referred to as kanji, hiragana and katakana (these characters shall be referred to collectively as "Japanese characters") differs greatly from the European languages that employ one character set, namely the Roman alphabet. In general, hiragana and katakana (referred to collectively as kana) are designed to be somewhat smaller than kanji and it is possible to combine separately designed kanji and separately designed kana.

A Japanese character is formed inside a design frame referred to as a "body". Unlike the Roman alphabet, in which characters can have different widths from one character to the next, the widths of Japanese characters do not change from character to character. Further, whereas the longitudinal line in the alphabetic character "P", for example, is designed to be vertical, the two longitudinal lines in the kanji 門 are designed to converge slightly at their lower ends in certain styles of type. The reason for this design is to compensate for the illusion of a "top heaviness", which gives the character an unstable appearance. Such compensation for optical illusions is a characteristic of kanji.

Furthermore, since some kanji are composed of many vertical and/or horizontal lines, achieving balance among these lines is important. The blank space between two lines is referred to as "white space". Reproducing a white space to have the same balance as that possessed by the original design is one requirement in achieving a character having high quality.

When a kanji character having these features is expressed by a collection of very small dots, it is difficult to achieve a fine representation smaller than the size of the individual dots. When the number of dots is small, not only is it impossible to represent slender portions of the original design but there are even instances where all horizontal or vertical lines in the character cannot be properly spaced. Such improper spacing produces a deteriorated, indistinct character whose lines run together. In a situation where the number of dots is too small to express a character design, the only function left for the character is merely the transmission and/or recording of information. In such cases, therefore, the chief aim is to prevent character deterioration, rather than to provide attractive design, in order to improve legibility. The question of design, i.e., as to which style of type is being used, is no longer important.

In the case of a bitmap font in which an optimum character pattern is formed by the human hand, a technique employed to prevent character deterioration and maintain legibility is to change the balance of the overall character or thin out some of the vertical or horizontal lines. In the case of a character composed of 16×16 dots used to present a display on the screen of a personal computer or word processor, the above-mentioned technique usually is employed. Since the lines thinned out are selected with great care, there are instances where they cannot be noticed at a glance.

However, when a plurality of sizes are required, character patterns conforming to the various sizes must be prepared for bitmap fonts, thus necessitating a memory having a large storage capacity. In order to reproduce characters of various sizes using a small quantity of data without sacrificing the style of the printing type, there has been a shift from bitmap fonts in favor of outline fonts. As shown in FIG. 34, an outline font is one in which the contour of the character is expressed by coordinates in a 1000×1000 XY coordinate system. The contour data are outputted upon being bit-mapped by a character generating program. With such outline fonts, multiple-point designation (the designation of different printing sizes) is possible. Character quality can be maintained without compromising the style of the printing type regardless of how large the character is made.

Unfortunately, however, outline font techniques presently available have a disadvantage. Specifically, the smaller the point size at which a character is made, the greater the decline in character quality produced and the more unattractive the form of the character appears to the naked eye. This is due to rounding error, which arises when the contour of a character expressed in a 1000×1000 XY coordinate system is expressed in a physical coordinate system of m×m dots (e.g., 16×16 dots). FIGS. 35A, 35B are examples of samples of characters outputted using conventional outline fonts and bitmap fonts. FIG. 35A illustrates a sample based upon conventional outline fonts, and FIG. 35B shows an example based upon bitmap fonts. The characters in the upper row of each Figure are composed of 24×24 dots, the characters at the left of each lower row are composed of 18×18 dots, and the characters at the right of each lower row are composed of 14×14 dots. If the number of dots is large, a difference in quality between outline fonts and bitmap fonts is not noticeable. When character size is made small, however, the difference between these fonts manifests itself clearly. Specifically, with the outline fonts of 18×18 dots, the sizes of the characters are not uniform (the kanji 視 is larger than the other characters). With the outline fonts of 14×14 dots, portions of some characters are made indistinct by deterioration. In the case of the bitmap fonts, the fonts are formed by thinning out portions of the vertical or horizontal lines to prevent deterioration and maintain legibility and to change the overall balance when the number of dots is small. As a result, character deterioration and a variance in character size can be prevented. FIG. 35C illustrates character samples based upon fonts composed of parts in accordance with the present invention, described later.

Thus, with the conventional outline font techniques, fine processing cannot be executed, as is possible with bitmap fonts. When character size is reduced, a variance in size occurs and the characters deteriorate. The reason for this is the occurrence of rounding error, as mentioned above, and the fact that "camouflage" utilizing visual characteristics cannot be applied. Furthermore, with processing using the conventional outline fonts, there are instances where slender character portions that appear needless to the human eye are reproduced as emphasized. This occurs because it is not possible to determine which portions of a character are important for the purpose of improving legibility.

In summary, therefore, bitmap fonts created by the human hand have a high quality but require a large memory capacity and do not satisfy the needs of the DTP (desktop publishing) age. On the other hand, the conventional outline fonts are suitable for DTP. However, since the character images are generated by processing, there is a decline in quality where small characters are concerned.

Accordingly, there is a need to be able to generate character images having a high quality equivalent to that of bitmap fonts but by using outline fonts.

A kanji character is by nature a collection of a plurality of vertical and/or horizontal lines. With the conventional outline font technique, however, all of the vertical and horizontal lines are lumped together to express contour lines, as a result of which the above-described problems arise. Accordingly, as illustrated in FIG. 36, contours are partitioned into single strokes [strokes STi (i=1, 2, ...)] such as vertical lines, horizontal lines, oblique lines, right sweeps and left sweeps, the contours are expressed per each stroke STi, the character is captured as a collection of these strokes, the contour data of each stroke are bitmapped by a character generating program and the bitmap is outputted. If this expedient is adopted, the relationship between vertical lines or horizontal lines, etc., is clarified. Moreover, which portions of a character are important and which are unnecessary for the purpose of improving legibility can be ascertained to make various types of control possible.

It is possible to build upon this concept. Specifically, in case of a small character size, recognition of the form of the character is more important than a difference in the style of type. Therefore, if information (basic stroke information) representing the form of the character and information (contour information) representing the style of type can be separated, high-quality characters can be generated from small-size characters, in which legibility is important, to large-size characters, in which reproduction of the distinctive quality of the style of type is important. The basic stroke information mentioned here is information about the basic structure of the character form and is not information regarding central lines that flesh out a character.

Accordingly, there developed an outline font technique which includes (1) separating each character into strokes using basic stroke (skeleton) information, (2) dividing the strokes into parts, (3) defining the contour of each part and expressing the character as a collection of the parts, and (4), in outputting the character, developing the contours of the parts constructing the character into a bitmap image and outputting the bitmap image of the character.

FIG. 37 is a diagram for describing a character, strokes and parts. This illustrates a case where the kanji character 舞 is separated into strokes (a character-to-stroke cut) and the strokes are divided into parts (a stroke-to-part cut). The collection of the parts forms the contour information. In FIG. 37, the "elements" are illustrated to expedite the explanation and are not units used in actual processing. The kanji character 舞 is separated into a number of strokes, each stroke is cut into parts (a starting part, a middle part and an end part) appropriately, and the parts form the contour information.

FIG. 38 is a diagram for describing basic stroke information. A stroke number is assigned to each stroke in accordance with the order in which a character is written, and stroke disposition data (starting point and end point) of the strokes and stroke codes indicating the types of strokes are assigned in the order of the stroke numbers to construct the information. FIG. 38 illustrates the basic stroke information of the kanji character 三

As shown in FIGS. 39A and 39B, the contour shape of each part is expressed by arraying, in the counter-clockwise direction, the coordinate values (in the part coordinate system) of the points P1~P6, Q1~Q4 of the part outlines. FIG. 39A illustrates the shape of the starting part of the kanji character ━━▲ and FIG. 39B illustrates the shape of the end part of the kanji character ━━▲

FIG. 40 is a diagram for describing the structure of a font file in which a character is expressed by a collection of parts.

The file includes a header field $1a$ for storing various font-related information such as the font name and the date of its creation, and a character pointer field $1b$ which stores a character pointer for pointing to a parts pointer string conforming to the character code. A part pointer field 2 stores (1) disposition data of all parts constructing the character, and (2) pointers to part contour data. A contour data field 3 stores part contour data of all parts. The part disposition data in the part pointer field 2 indicate where in the outline font coordinate system (a coordinate system of 1000×1000 dots) a part is disposed. Specifically, the part disposition data indicate the positional coordinates of the part origin (see FIGS. 39A, 39B) in the character coordinate system. As shown in FIGS. 41A and 41B, the disposition data illustrated in FIG. 40 is for a case where the part origin of the starting part of the lowermost horizontal stroke (horizontal line) in the kanji character 三 is given by (56,493), the part origin of the middle part is given by (111,493) and the part origin of the end part is given by (953,493).

When an outline font expressed in a logical coordinate system is reduced to a target size, decimals are always produced. However, since an output by printing or by display on a display screen can only be performed in the form of individual dots, numbers with decimal portions must be made whole numbers as by being rounded off. Rounding error is always produced by this operation for attaining whole numbers and causes a decline in character quality. Accordingly, hint information is assigned to the contour shape data of parts in order to prevent a decline in character quality.

Hint information is control information assigned to a contour shape which is important in terms of deciding character quality. Examples of hints are a hint (referred to as a stem hint) for controlling line width, a hint (referred to as a scale hint) for controlling the hari-portion of a Kanji character designed for a style of type, and a rounded Gothic hint for clearly manifesting the roundness of rounded Gothic type.

FIGS. 42A through 42C are diagrams for describing a stem hint. Assume that when an outline font expressed by a logical coordinate system of 1000×1000 dots is reduced in size for the purpose of effecting a size conversion to a physical coordinate system of, say, 16×16 dots, the Y coordinates of points A, B have become 6.5 and 5.3, respectively, as shown in FIG. 42A. In such case the conversion is made to the physical coordinate system by rounding off each of the Y coordinates to the nearest whole number (i.e., by applying a grid correction). As a result, the Y coordinate of point A becomes 7, the Y coordinate of point B becomes 5 and the line width becomes 2, as shown in FIG. 42B. However, since the actual line width is 1.2 (=6.5−5.3), this is rounded off to 1. Thus, if hint control of some kind is not assigned, the line width will become 2 and the output thereof will be too thick. The result will be the output of a character that is widely different from the character originally designed. In other words, character quality declines.

Accordingly, absolute stem hint information as is assigned to point A of the outline font, and relative hint information rs is assigned to the point B of the outline font. When such hint information is assigned, the effects are as follows: When the Y coordinate of point A (to which the absolute stem hint as has been assigned) is rounded off to 5, the discarded fraction 0.3 (=5.3−5.0) is subtracted from the Y coordinate 6.5 of point B (to which the relative hint information has been assigned), with the result that 6.2

(6.5–0.3) is rounded off to the nearest whole number. Accordingly, the Y coordinate of point B becomes 6 and the line width can be made 1, as shown in FIG. 42C. This makes it possible to prevent a decline in character quality.

FIGS. 43A through 43C and FIGS. 44A through 44C are diagrams for describing a scale hint. In a case where outline font data are reduced or enlarged in a logical coordinate system, results of the kind shown in FIG. 43A are obtained as the coordinates of each of the points on the curves. With the conventional method, the coordinates of each point in the logical coordinate system are rounded off to the nearest whole numbers (by the grid correction) to implement the conversion to the physical coordinate system, as shown in FIG. 43B. A bitmap is obtained based upon these data in the physical coordinate system, as depicted in FIG. 43C.

According to this conventional method, however, the dot representation of the scales is enlarged when the grid correction is applied, the scales become larger than the stem width D of the stroke and the character balance is lost. Accordingly, when the grid correction is applied at scale point a, a change dy, which is produced when the Y coordinate value of point e possessing the stem hint is subjected to the grid correction, is added to the Y coordinate value of the point a of the scale hint, as illustrated in FIG. 44A. As a result, the distance between the stem hint point e of a middle part PM and the scale hint a of an end part $P_E$ in the logical coordinate system is preserved. The Y coordinate of the scale hint point a is subjected to the grid correction under these conditions, as depicted in FIG. 44B. Thereafter, a bitmap is generated, as shown in FIG. 44C, based upon the grid-corrected data in the physical coordinate system. If this arrangement is adopted, the dot representation of the scales becomes smaller and a decline in character quality can be prevented.

In this outline font technology for cutting the outline of a character into parts, defining the outline of each part, expressing the character by the collection of the parts and, in outputting the character, developing the outlines of the parts constructing the character into bitmap images and then outputting the images of the character, it is required that hints be assigned to strokes or parts efficiently.

Further, even if data can be shared, the font file produced by the above-described outline font technology possesses these data for each part. As a result, the font file is large in size and a memory having a large storage capacity is required.

SUMMARY OF THE INVENTION

Accordingly, an object of the present invention is to provide a hint assignment method through which hints can be assigned to the character elements of strokes or parts efficiently.

Another object of the present invention is to provide a semiautomatic hint assignment method in which, if character elements whose shapes are similar and to which identical hint information is assigned are divided into classes automatically, a hint is assigned solely to the master element of each class by operator operation and the system is made to learn the assignment of the hint, then the system can subsequently assign hints to other elements automatically.

A further object of the present invention is to provide a font file construction method through which parts are divided into groups and data that can be shared by the parts in the group need only be prepared singly for the group, thereby making it possible to reduce the size of the font file and, hence, reduce the amount of memory capacity used.

Yet another object of the present invention is to provide a font file construction method through which the outline of a font is described upon being condensed and, moreover, the control data used in the condensed description are shared in every part group, thereby making it possible to achieve an even greater reduction in the size of the font file.

According to the present invention, the foregoing objects are attained by providing a method of assigning hints in an outline-font creation apparatus for cutting an outline of a character into elements thereof, assigning hint data to the elements to control the shape thereof and expressing a character by a collection of the elements, the method comprising a first step of dividing elements having similar outlines into classes, a second step of learning hint assignment by storing hint information which prevails when a hint is assigned by operator operation to a predetermined position of an outline of a representative element (master element) of each class, and a third step of assigning hint information automatically to elements of the class, to which the master element belongs, using learned hint information of the master element.

Further, according to the present invention, the foregoing objects are attained by providing a font-file construction method in an outline-font creation apparatus for cutting an outline of a character into single strokes, cutting the strokes into parts and expressing the character by a collection of the parts, the method comprising a step of dividing parts having similar shapes into groups, constructing a part-group data section consisting of a header for recording data common to each part of the group and a part-outline block for describing an outline of each part which belongs to the group, and constructing a font file from a character code so as to obtain (1) data specifying the position of a part-group data section of a group to which each part constructing the character belongs and (2) data specifying the position of an outline block of each part in each part-group data section.

Other features and advantages of the present invention will be apparent from the following description taken in conjunction with the accompanying drawings.

BRIEF DESCRIPTION OF THE DRAWINGS

FIG. 7 is a diagram for describing hint information;

FIG. 12 is a diagram for describing the stroke attribute list;

FIG. 29 is a diagram for describing the architecture of a font file;

FIG. 30 is a diagram for describing a hint table;

FIG. 31 is a diagram for describing vector types;

FIGS. 35A, 35B, 35C are samples of outputted characters;

DESCRIPTION OF THE PREFERRED EMBODIMENTS (A) Overview of the invention (a) Overview of first aspect FIG. 1 is a diagram for describing a first aspect of the present invention. Specifically, FIG. 1 illustrates the architecture of an outline-font creation apparatus for cutting an outline of a character into elements (e.g., strokes) STi (i=1, 2 . . . ) thereof, assigning hint data to the strokes STi to control the shape thereof and expressing a character by a collection of the strokes. The apparatus includes a stroke memory 1 for storing the strokes STi, a stroke classifying unit 2 for dividing strokes STi having similar outlines into classes Ci, a classified-stroke memory 3 for storing the classified strokes according to class, a hint-assignment learning unit 4 for assigning a hint, by operator operation, to a predetermined position of the outline of a representative element (master stroke) of each class Ci, a master-stroke hint information memory 5 for storing hint information which prevails when a hint is assigned by operator operation, and an automatic hint assignment unit 6 for assigning hint information automatically to elements of the class, to which the master element belongs, using learned hint information of the master stroke.

The stroke classifying unit 2 divides strokes having similar outlines into classes, and the hint-assignment learning unit 4 assigns a hint, by operator operation, to predetermined position of the outline of the representative element (master stroke) of each class and stores the hint information in the memory 5, thereby learning hint assignment. The automatic hint assignment unit 6 assigns hint information automatically to elements of the class, to which the master element belongs, using learned hint information of the master stroke.

Thus, character elements whose shapes are similar and to which identical hint information is assigned are divided into classes automatically, a hint is assigned solely to the master element of each class by operator operation and the system is made to learn the assignment of the hint. The system subsequently assigns hints to the other elements automatically. As a result, hints can be assigned to character elements such as strokes or parts semi-automatically in a highly efficient manner.

(b) Overview of second aspect

Figure 1:
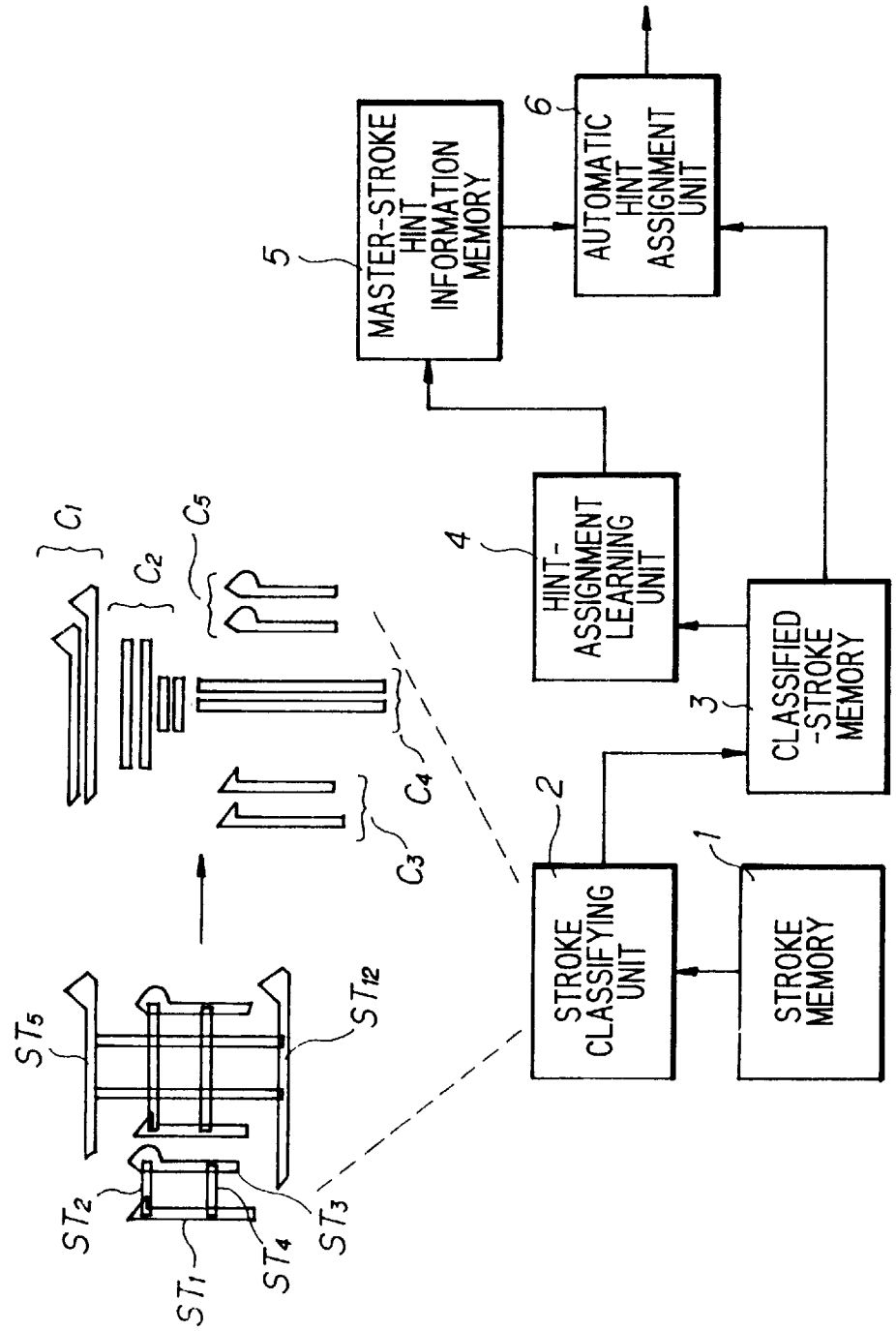
FIG. 1 is a diagram for describing an overview of a first aspect of the present invention.
Figure 2:
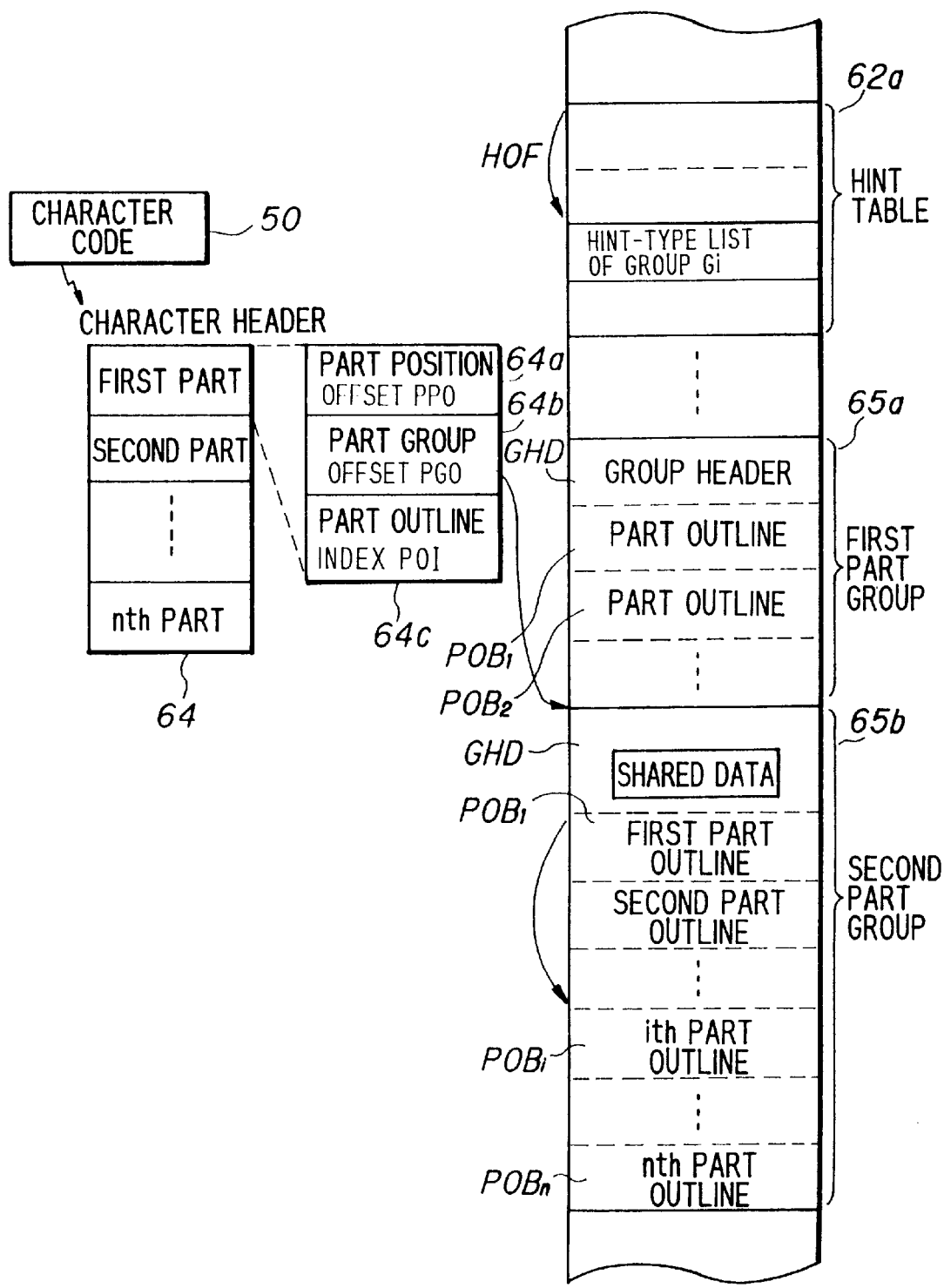
FIG. 2 is a diagram for describing an overview of a second aspect of the present invention.

FIG. 2 is a diagram for describing a second aspect of the present invention. Specifically, FIG. 2 illustrates a font-file construction method for cutting an outline of a character into single strokes, cutting the strokes into parts and expressing the character by a collection of the parts.

In FIG. 2, numeral 50 denotes a character code. Numeral 64 denotes a character header section which indicates the outline data position of each of the parts (first through nth parts) constructing the character. The character header section 64 describes the following for each part: (1) a part position offset (PPO) 64a, (2) a group position (part group offset PGO) 64b, to which the part belongs, in a case where parts having similar shapes are divided into groups and the outline information of each part is stored according to group, and (3) outline data position (part outline index POI) of the part in the group. Numerals 65a, 65b, denote part groups. Each part group has a header GHD for recording data common to each part belonging to the group, and a part outline block POBi (i=1, 2, . . . ) which describes the outline data of each part belonging to the group. Numeral 62a denotes a hint table which stores, on a per-group basis, a hint-type list in which the types of hints (mark hint, scale hint, curve hint, etc.) assigned to the outlines of parts are arrayed in regular order.

The part groups 65a, 65b, . . . , which are obtained by dividing parts having similar shapes into groups, are composed of (1) the header GHD for recording data common to each part belonging to the group, and (2) the part outline block POBi (i=1, 2, . . . n) which describes the outline of each part belonging to the group. Further, a font file is constructed in such a manner that it is possible to specify the position PGO of the group to which each part constructing the character indicated by character code 50 belongs, as well as the outline block position POI of a part in the group. Thus, it suffices if parts are divided into groups and only one set of data capable of being shared by the parts in the group is prepared for the group. This makes it possible to reduce the size of the font file and, hence, reduce the amount of memory capacity used.

The type of a vector connecting adjacent points among contour points specifying the outline of a part is classified upon taking into account whether the vector is horizontal, vertical or inclined as well as the length of the vector, and data length necessary for expressing the vector of each type is decided. The type of each vector constructing the outline of a part is described in the shared data portion of the header GHD. If this arrangement is adopted, each vector, i.e., each part outline, can be expressed by a suitable data length conforming to the direction and length of the vector, and the size of the font file can be reduced (the outline data can be condensed). Further, the data length of each vector can be recognized from the type description in the shared data portion when the outline data are read, and the outline information can be read out correctly.

Furthermore, the hint-type list in which the types of hints assigned to part outlines are arrayed in regular order is described for every group, and a hint offset HOF, which indicates the position of the hint-type list in the hint table, is described in the shared data portion of the header GHD. If this arrangement is adopted, a hint-type list can be read out based upon the hint offset HOF and hint information can be assigned to the part outlines. Further, since it suffices for one hint table to be provided for the groups, the size of the font file can be reduced.

(B) Overall configuration of the invention (a) Architecture

Figure 3:
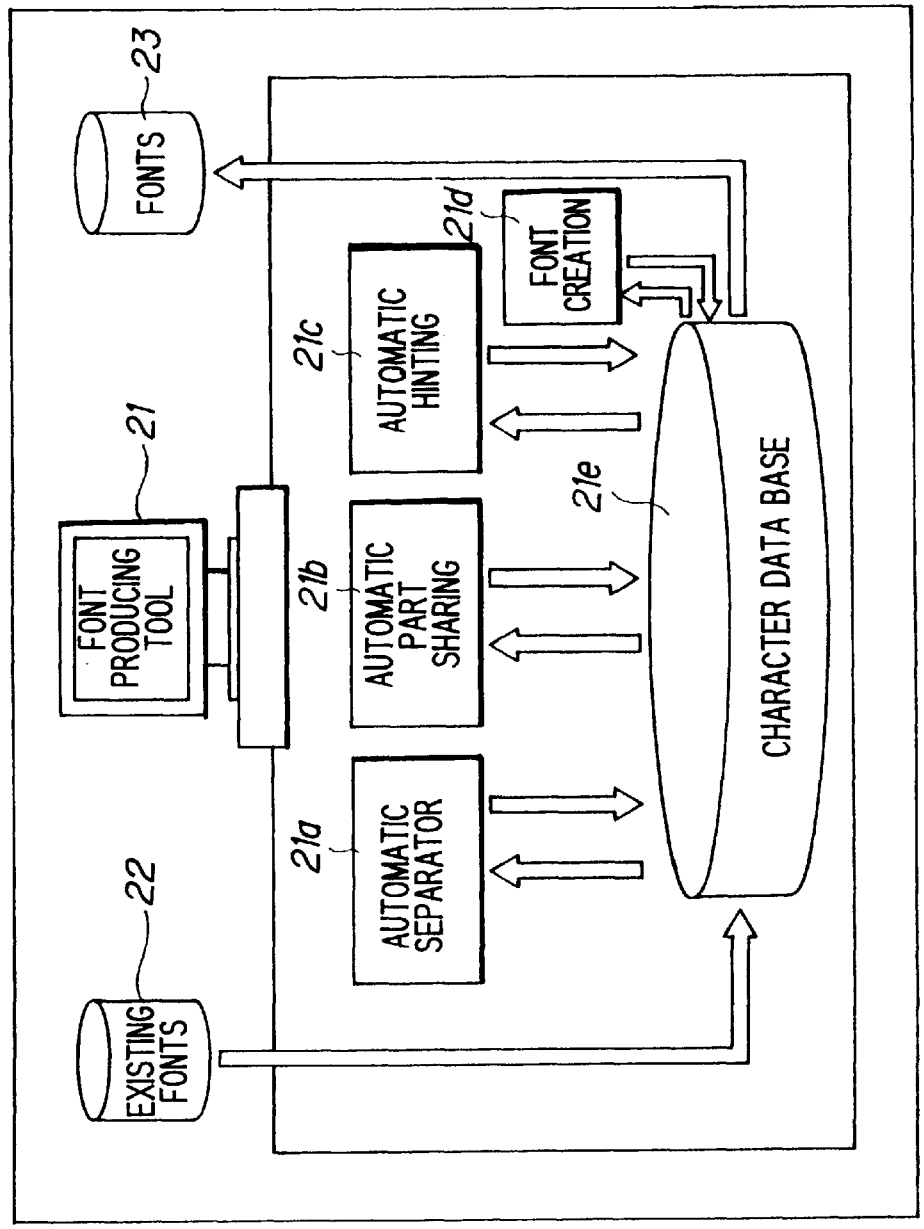
FIG. 3 is a diagram showing the architecture of a font producing tool.

FIG. 3 is a diagram showing the architecture of a font producing tool. The font producing tool divides an existing font into strokes, divides the strokes into parts, assigns hints to the outline shapes of the parts and converts each character to a font (referred to as a "part-element font") expressed by a collection of parts.

Numeral 21 denotes the font producing tool, which includes an automatic separation unit 21a for dividing an existing font 22 into strokes and dividing the strokes into parts, an automatic part-sharing unit 21b which reduces the number of parts by making shared use of parts of identical shape, an automatic hint unit 21c for assigning hint information to each part, a font creating unit 21d for creating a font file 23 which expresses each character by a collection of parts, and a character data base 21e. The character data base 21e stores (1) existing fonts that have been read in, (2) basic-character information of each character, (3) stroke information and part information obtained by character-to-stroke cutting processing and stroke-to-character part cutting processing, and (4) a font file that has been created.

(b) Overview of processing

The font producing tool 21 converts the existing font 22 to the part-element part 23 via a format conversion, automatic separation processing, automatic hint processing and font-file creation processing, in the order mentioned, and outputs the font 23.

First, the existing outline font 22 possessed by the user is converted to the format of the font producing tool. All of the converted character information is stored in the character data base 21e.

Next, the entered character is separated into strokes and the strokes are separated into parts. In automatic separation, first a learning mode is started up and the user cuts representative characters into strokes and cuts the strokes into parts on a control screen and causes the system to learn the rules for cutting the characters into these strokes and parts. Thereafter, when batch processing is started, the system cuts several thousand remaining characters into strokes and parts automatically in accordance with the rules learned. Even if a character has a special shape to which the results of learning cannot be applied, this can be dealt with by repeating the adding on of learning information and the execution of automatic separation so that it will be unnecessary for all remaining characters or strokes to be separated by a manual operation.

This is followed by performing processing for the sharing of parts (automatic part sharing). Even kanji characters having a complex shape can be rendered into simple figures by being separated into strokes and then into parts. However, if 7000 characters were cut into strokes, the result would be about 91,000 strokes, and if all these strokes where cut into parts, the result would be about 210,000 parts, thereby necessitating a memory having a large storage capacity. Accordingly, parts whose shapes are regarded as being "almost identical" are shared.

When processing for automatic sharing of parts is finished, the assignment of hints is performed. In hint assignment processing, the user adds on a hint to indicate a model of handwriting in the learning mode in a manner similar to that of automatic separation processing, whereupon the hint information is added on automatically by applying the particular rule.

(c) Hardware configuration of font producing tool

Figure 4:
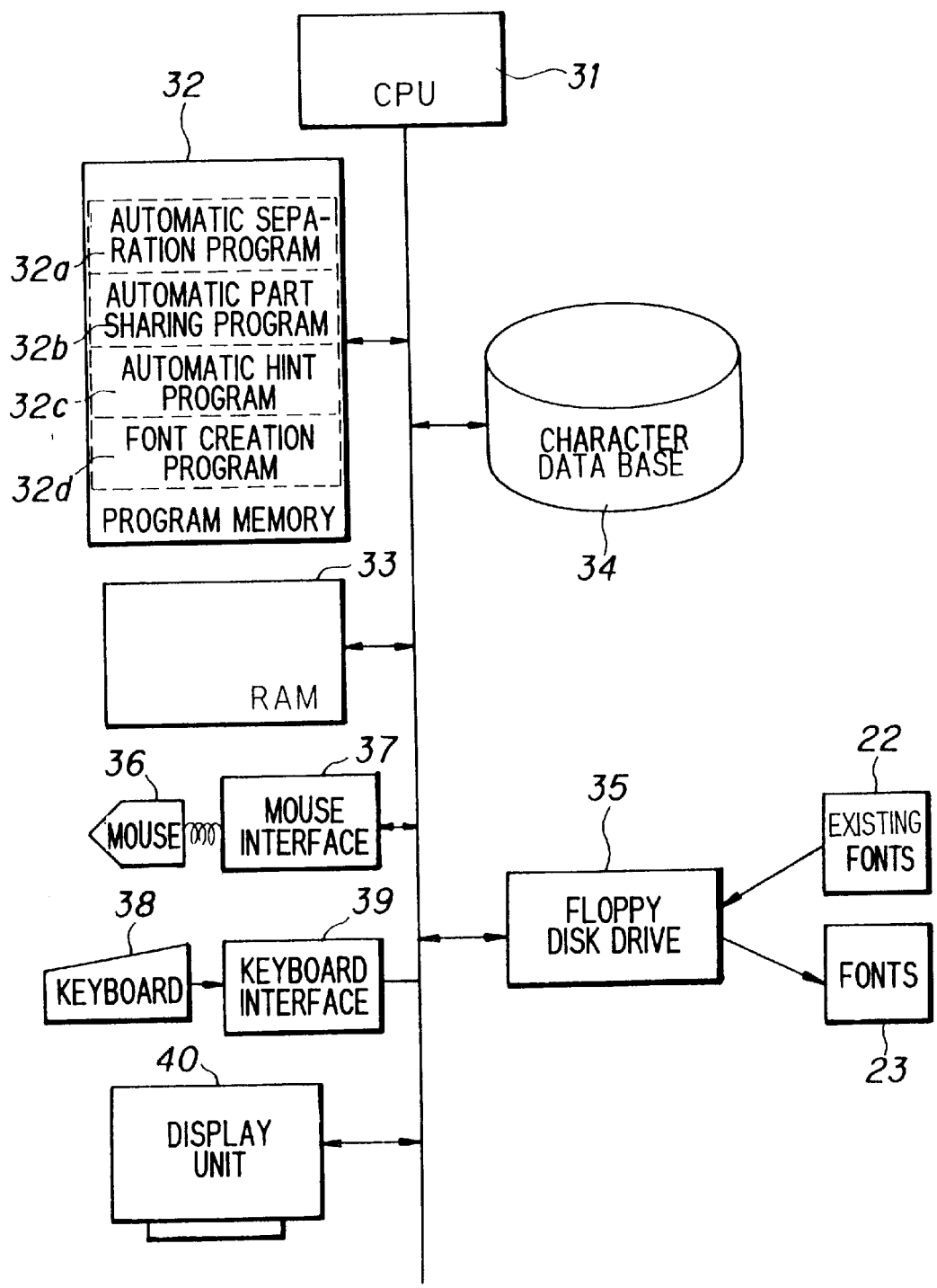
FIG. 4 is a diagram showing the hardware implementation of the font producing tool.

FIG. 4 is a diagram showing the hardware implementation of the font producing tool. The tool includes a processor (CPU) 31, a program memory 32 for storing an automatic separation program 32a, an automatic part sharing program 32b, an automatic hint program 32c and a font creation program 32d, a RAM 33, a character data base (which corresponds to the data base 21e in FIG. 3) 34 consisting of a hard disk or the like, a floppy disk drive 35 for reading in an existing font file 22 and outputting a produced font file 23, a mouse 36, a mouse interface 37, a keyboard 38, a keyboard interface 39 and a display unit 40.

The following information is stored in the character data base 34:

(1) a basic stroke file (BSF) for each character;

(2) an existing font file that has been read in;

(3) stroke information obtained by processing for cutting a character into strokes automatically;

(4) part information obtained by processing for cutting strokes into parts automatically;

(5) various information (classified strokes, master-stroke hint information, stroke hint information, etc.) generated when hints are assigned; and (6) a produced font file.

(C) Hint assignment processing (a) Overall flow of processing

Figure 5:
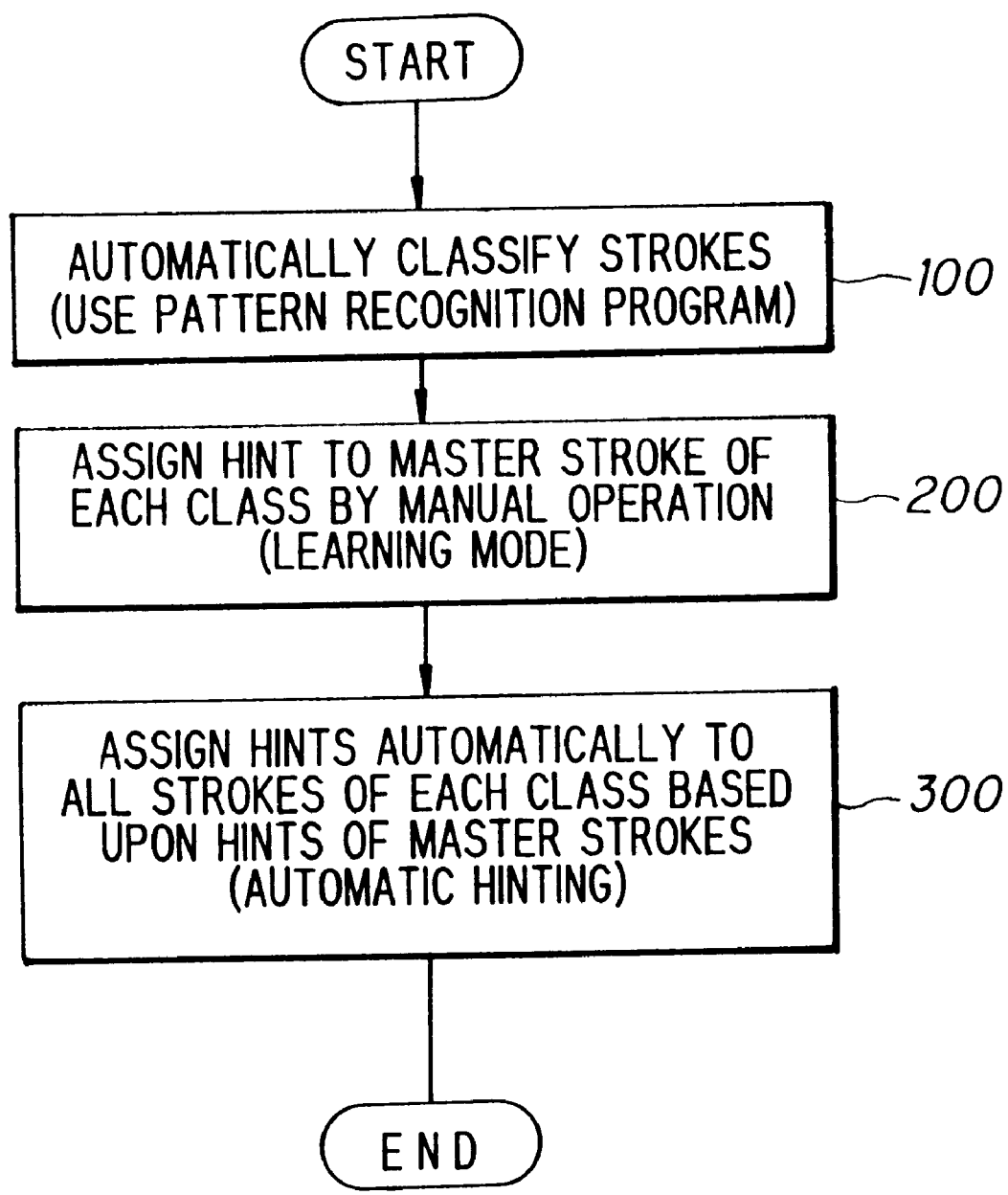
FIG. 5 shows the overall flow of hint assignment processing.

FIG. 5 shows the overall flow of processing for hint assignment. In the case described below, hints are assigned to strokes. However, it goes without saying that the invention can be applied to the assigning of hints to parts as well.

Figure 6A:
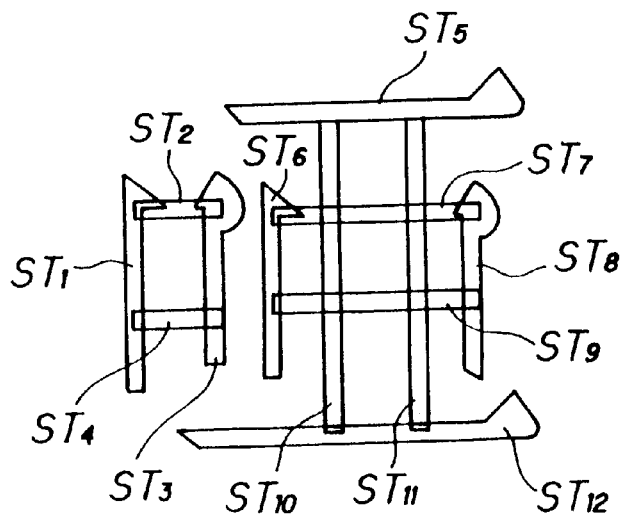
FIGS. 6A, 6B are diagrams for describing strokes and stroke classes.
Figure 6B:
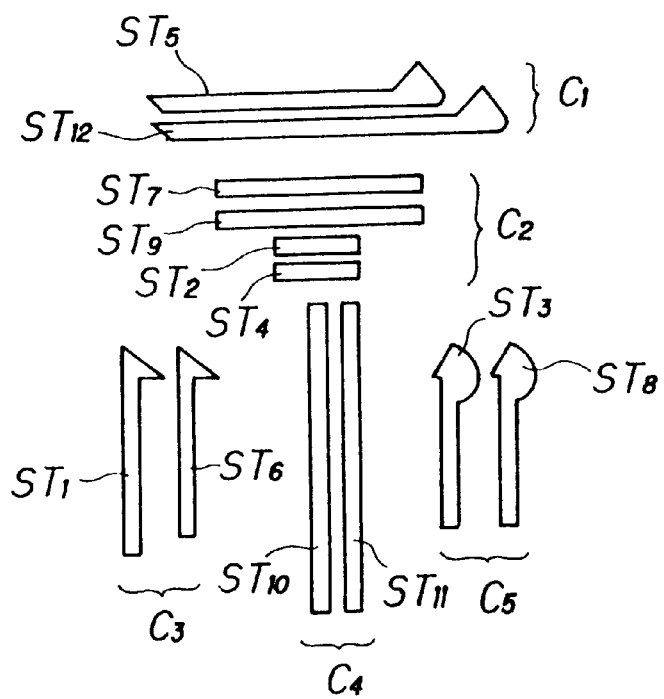

Characters have already been cut into strokes STi (i=1, 2, . . . ) and stored in the character data base 34 by automatic separation processing, as illustrated in FIG. 6A. Under these conditions, strokes having similar outlines are divided into classes Ci (i=1, 2, . . . ), as shown in FIG. 6B (step 100). Similar outlines are outlines having the same shapes and it is not required that they have the same size. For example, the shape of class C2 is a class of horizontal lines (horizontal strokes) all four corners of which define right angles. Length is not a factor in placing outlines in the class. The reason for this is that the same hint is assigned to the same contour points of strokes whose shapes are similar.

Next, a hint is assigned by operator operation to a predetermined position of the outline of a master stroke in each class Ci, and this hint information is stored in the character data base 34 (step 200; learning of hint assignment). Learning of hint assignment is performed by displaying the outline of the master stroke on a display screen, selecting, through use of a mouse cursor, a contour point to which a hint is desired to be assigned, and entering the hint type (absolute hint, relative hint, curve hint, mark hint or scale hint, etc.) as well as the direction in which contour control is carried out based upon the hint type. A hint for which the direction of contour control is the X direction is referred to as an "X hint", and a hint for which the direction of contour control is the Y direction is referred to as an "Y hint".

By virtue of the learning process described above, hint information is created and stored in the data base 34 to correspond to the contour points $P_1 \sim P_n$ of a master stroke, as illustrated in FIG. 7. In FIG. 7, as represents an absolute stem hint, rs a relative stem hint, c a curve hint and m a mark hint. A mark hint is a dummy hint. It is stipulated that a hint is assigned to an extremal point of the outline (where the extremal point is a point at which coordinate values change from a decreasing tendency to an increasing tendency or vice versa). In a case where hint control is not performed at the extremal point, the mark hint is assigned to this point. When the learning of hint assignment is finished, hint information is automatically added onto the strokes of the class to which the master stroke belongs using the learned hint information of the master stroke (step 300; automatic hinting).

Thus, strokes whose shapes are similar and to which identical hint information is assigned are divided into classes automatically, a hint is assigned solely to the master stroke of each class by operator operation and the system is made to learn the assignment of the hint. The system subsequently assigns hints to the other strokes automatically. As a result, hints can be assigned to strokes semi-automatically in a highly efficient manner.

(b) Stroke classification processing (b-1) Overall processing

Figure 8:
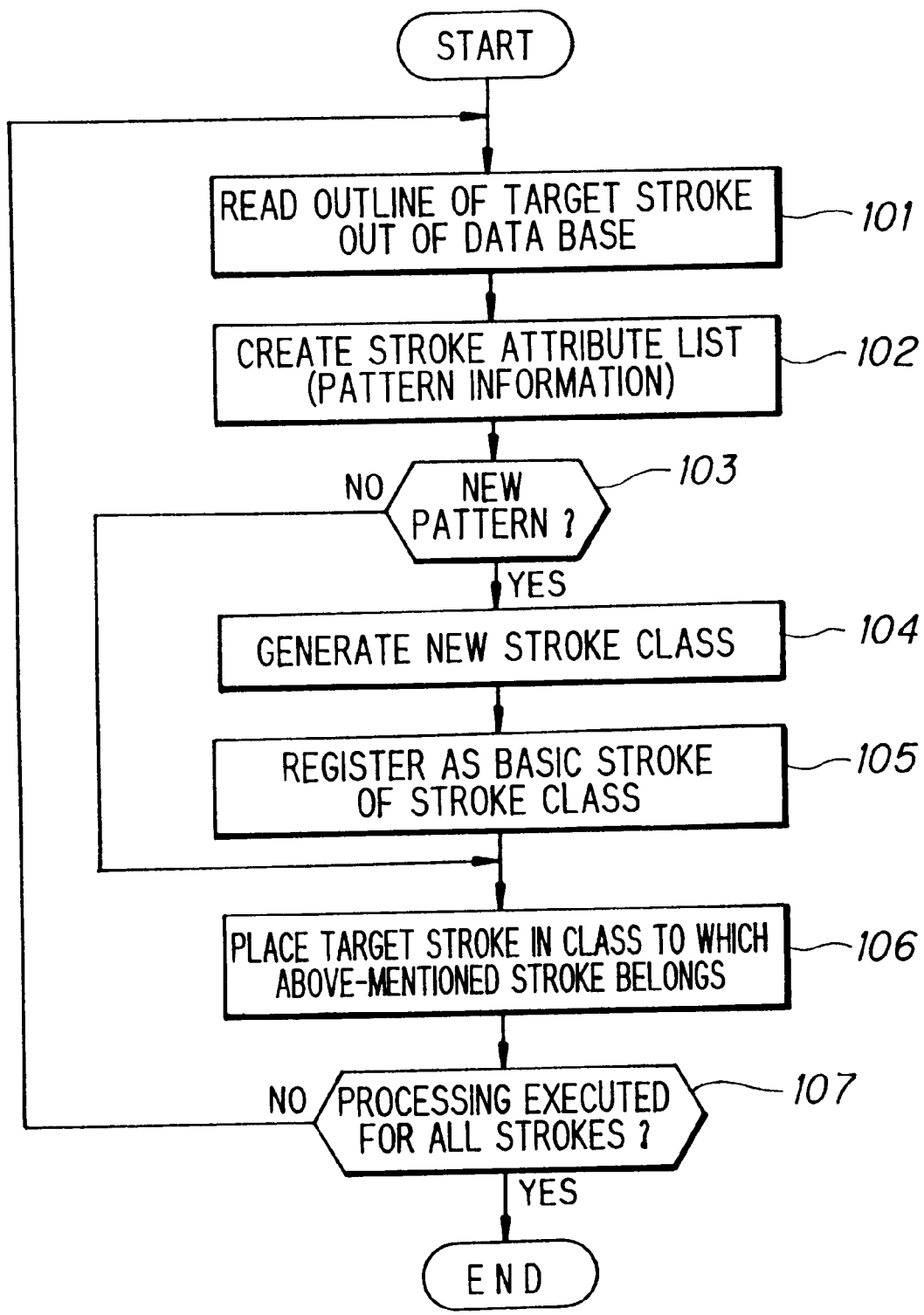
FIG. 8 shows the flow of processing for dividing strokes into classes.

FIG. 8 shows the flow of processing for dividing strokes into classes.

The outline data of a target stroke is read out of the character data base 34 (step 101). Next, a stroke attribute list (pattern information) is created from the outline information (step 102). Though the creation of the stroke attribute list will be described later, the general procedure is as follows:

(1) An angle of 360° is divided up into a plurality of directional ranges.

(2) It is determined whether the length of a vector connecting adjacent points among the contour points specifying the stroke outline is greater than a set length and whether the direction of this vector is different from that of the previous vector.

(3) If the length of the vector is greater than the set length and its direction is different from that of the previous vector, then the number of attributes (the initial value of which is zero) is counted up, this vector is adopted as an attribute segment and its direction, starting point and end point are stored in memory.

(4) If the length of the vector is less than the set length, then this vector is neglected.

(5) If the length of a vector is greater than the set length but its direction is the same as that of the previous vector, the end point of the previous attribute vector is updated to the end point of the current vector.

This processing is executed with regard to all vectors to create the stroke attribute list.

This is followed by referring to the stroke attribute list to determine whether the target stroke is a new pattern which does not belong to the currently existing classes (step 103). Though the details of this method of determination will be set forth later, a general procedure for determining whether a stroke is a new pattern is as follows:

When the numbers of attributes of two strokes are same and the arrays of direction data of the attribute segments are the same, the two strokes resemble each other. Accordingly, reference is made to the stroke attribute list of the basic strokes in each already generated class to determine whether there is a basic stroke whose number of attributes is the same as that of the target stroke and whose array of direction is the same as that of the target stroke. If such a basic stroke does not exist, the target stroke is a new pattern. If such a basic stroke does exist, then the target stroke resembles the basic stroke and is not a new pattern.

If the target stroke is a new pattern, a new stroke class is generated (step 104) and the target stroke is registered as the basic stroke of this new class (step 105). On the other hand, if it is found at step 103 that the target stroke is not a new pattern, then the target stroke is placed in the class to which the above-mentioned stroke belongs (step 106).

This completes the classification of the target stroke. This is followed by determining whether the above-described classification processing has been executed for all strokes (step 107). If classification of all strokes is not finished, the processing from step 101 onward repeated with regard to the next target stroke.

(b-2) Processing for creating stroke attribute list

Figure 9:
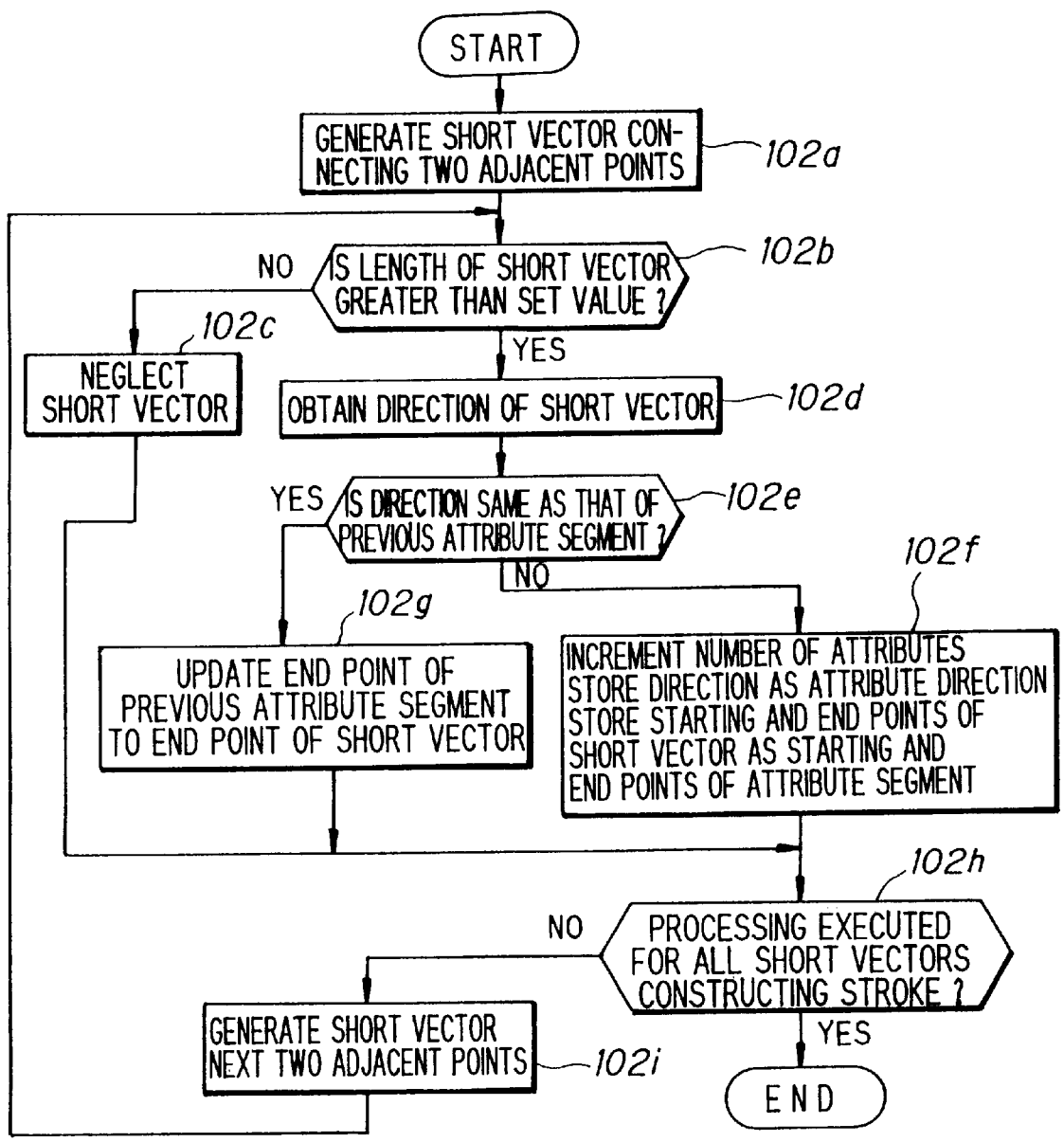
FIG. 9 shows the flow of processing for creating a stroke attribute list.
Figures 11A, 11B:
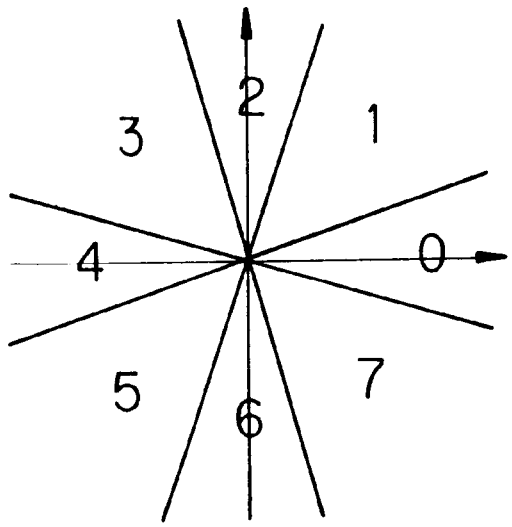
FIGS. 11A, 11B are diagrams for describing directions.

FIG. 9 shows the flow of processing for creating the stroke attribute list, FIGS. 11A, 11B are diagrams for describing vector directions, and FIG. 12 is a diagram for describing an example of the stroke attribute list.

A short vector connecting two points adjacent to each other when traveling in the counter-clockwise direction is generated (step 102a), the length of this short vector is obtained and it is determined whether the length obtained is greater than a set length (step 102b). If the length is less than the set length, the short vector is neglected (step 102c). If the length obtained is greater than the set length, however, then the direction of the short vector is obtained (step 102d). As shown in FIG. 11A, an angle of 0~360° is divided up into eight directional zones and it is determined in which directional zone the short vector belongs. As shown in FIG. 11B, the eight directional zones are −10°~10° (positive horizontal direction), 10°~80° (upper-right direction), 80°~100° (positive vertical direction), 100°~170° (upper-left direction), 170°~190° (negative horizontal direction), 190°~260° (lower-left direction), 260°~280° (negative vertical direction) and 280°~350° (lower-right direction).

Next, it is determined whether the direction is the same as that of the previous short vector (attribute segment) (step 102e). It should be noted that an attribute segment means a segment that has been registered in the attribute list (see FIG. 12).

If the direction is not the same as that of the previous attribute segment, (1) the number of attributes (the initial value of which is zero) is counted up, (2) the direction is stored as the attribute direction and (3) the starting and end points of the short vector are stored as the starting and end points of an attribute segment (step 102f in FIG. 9). If the direction is the same as that of the previous attribute segment, however, the end point of the previous attribute segment is updated to the end point of the short vector (step 102g).

Figure 10:
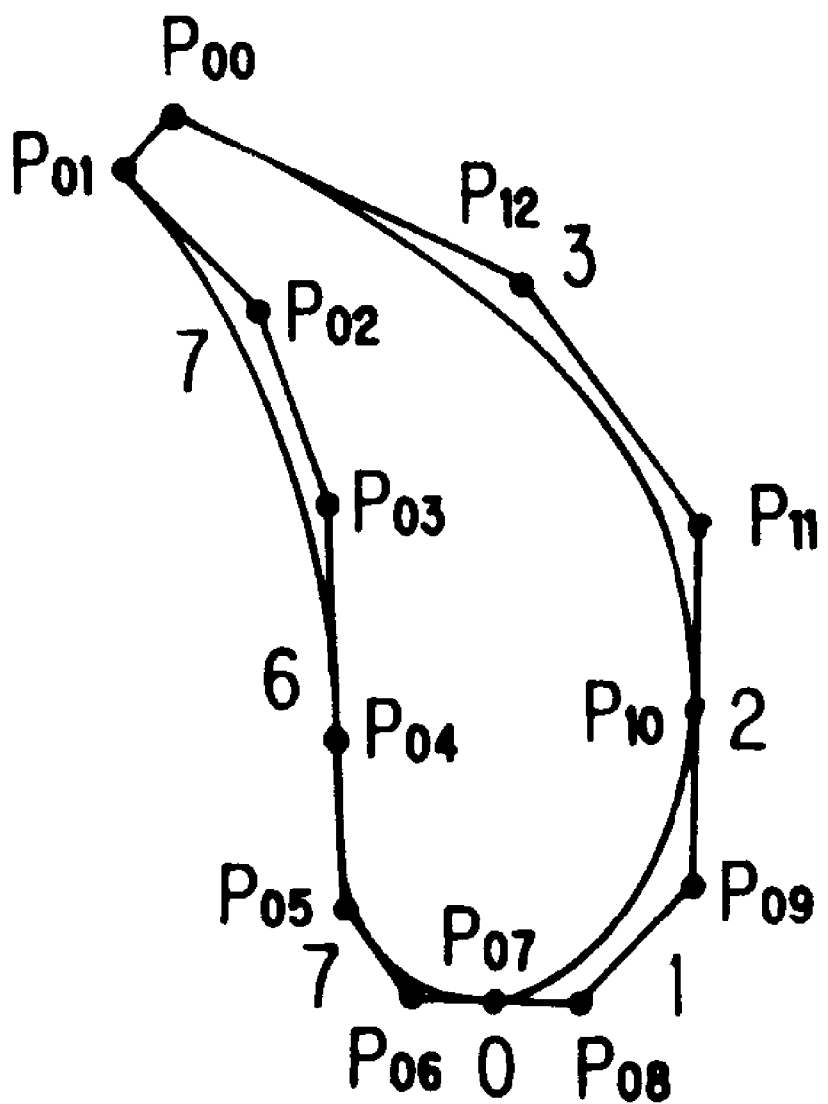
FIG. 10 is a diagram for describing a stroke outline.
Figure 13:
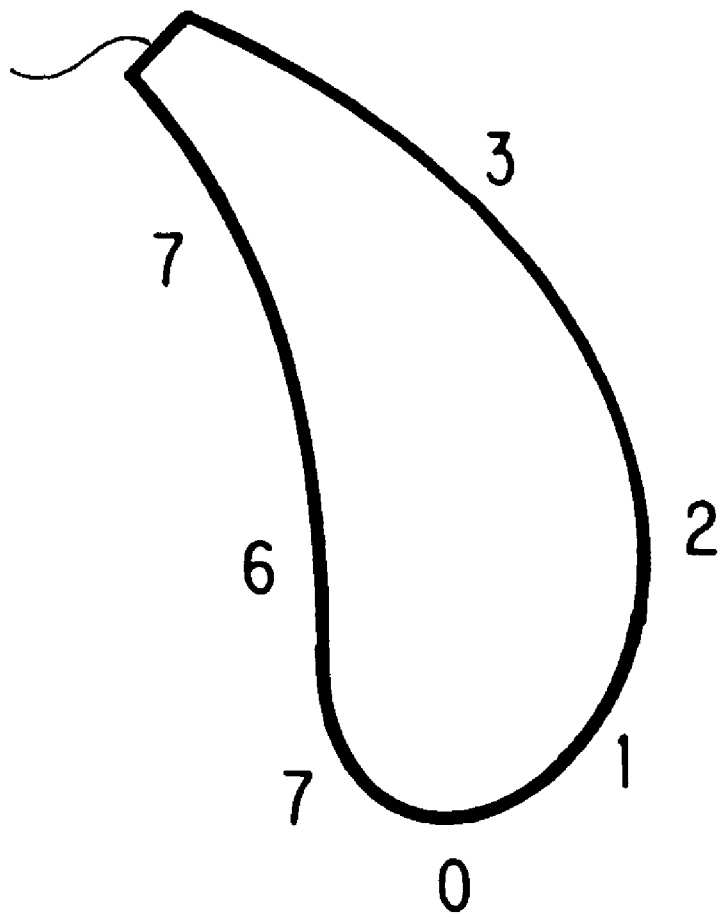
FIG. 13 is a diagram for an array of direction data.

Following the processing of steps 102c, 102f and 102g, it is determined whether the above-described processing has been executed for all short vectors constructing the outline of the stroke (step 102h). If the processing is not finished, then a short vector connecting the next two adjacent points is generated (step 102i), after which the processing from step 102b onward is repeated. When processing is executed with regard to the stroke outline of FIG. 10 by the method described above, the stroke attribute list shown in FIG. 12 is generated and the array of the direction data is 7→→6→7→0→1→2→3, as depicted in FIG. 13.

(b-3) Processing for discriminating identical patterns

Figure 14:
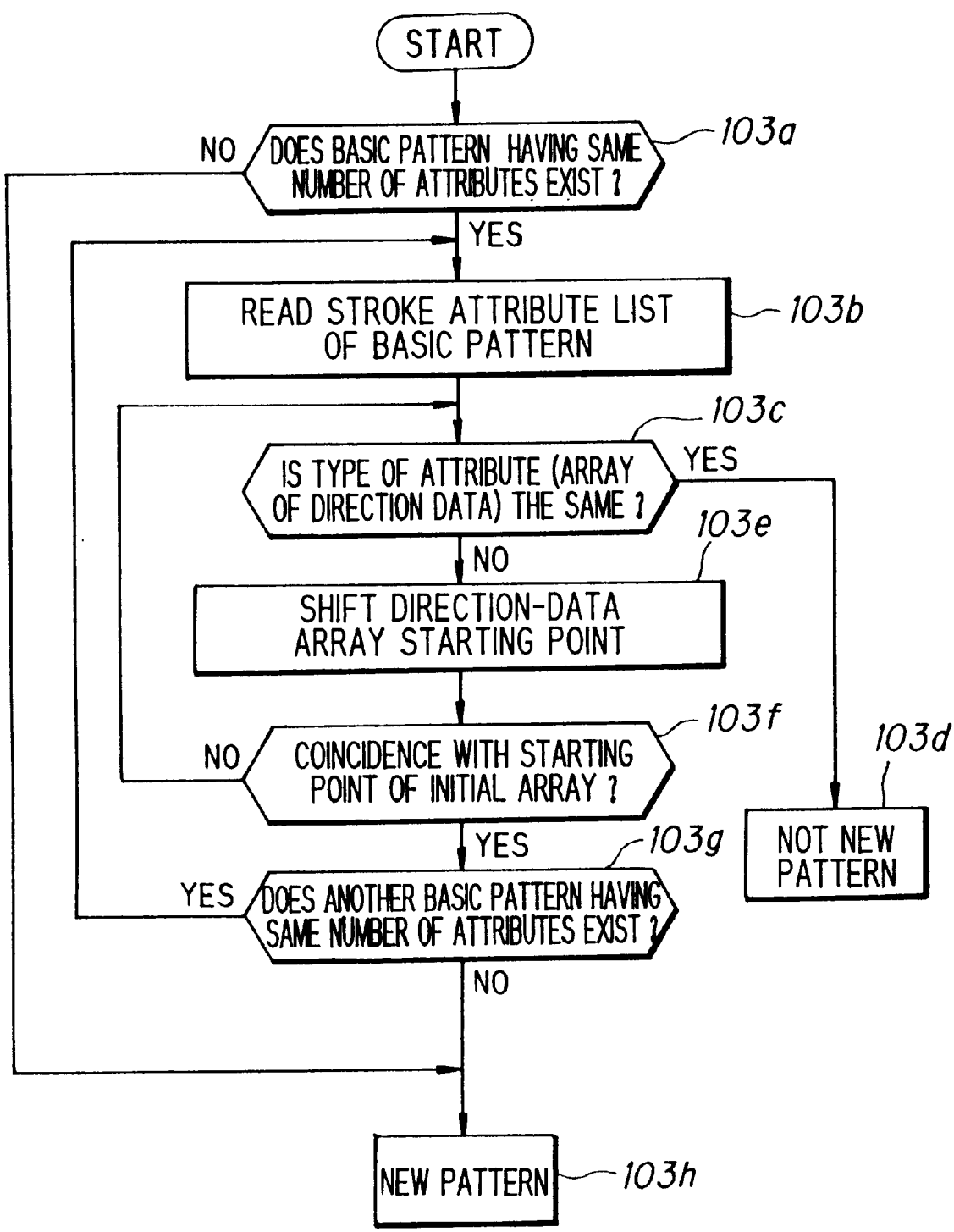
FIG. 14 shows the flow of processing for discriminating whether patterns are identical.

FIG. 14 is a flowchart of processing for determining whether patterns are identical.

First, reference is made to the stroke attribute list of the basic strokes in the already generated classes to determine whether there is a basic pattern whose number of attributes is the same as that of the target stroke (step 103a). If there is no such basic pattern, then the target stroke is a new pattern (step 103h).

However, if a basic pattern having the same number of attributes exists, then the stroke attribute list of this basic pattern is read (step 103b) and it is determined whether the attribute type is the same as that of the target stroke, i.e., whether the array of direction data is the same as that of the target stroke (103c).

Figure 15:
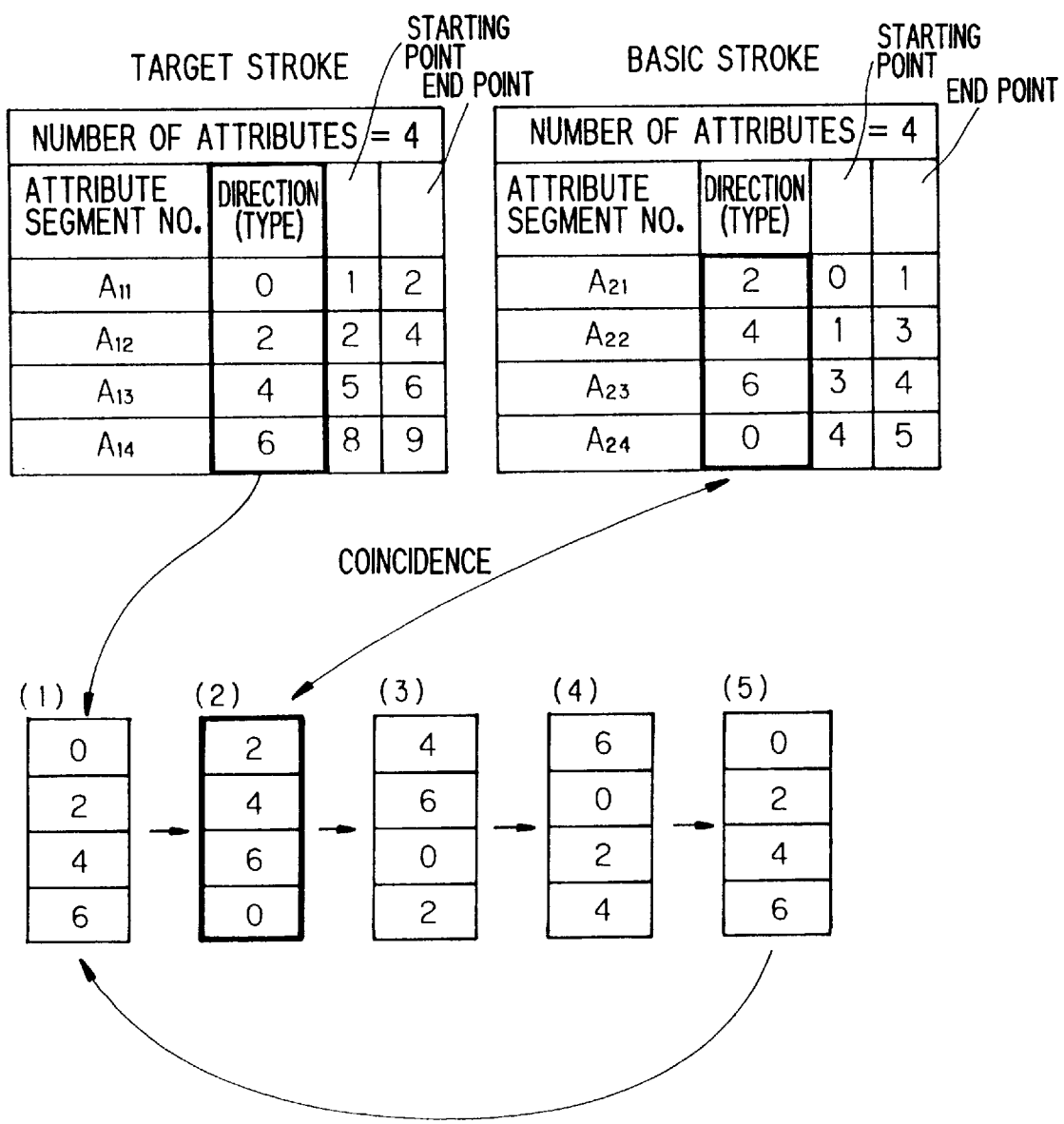
FIG. 15 is a diagram for describing whether patterns are identical.

The arrays of direction data are the same, then it is judged that the target stroke resembles the basic stroke and is not a new pattern (step 103d). However, if the arrays of direction data are different, the starting point of the array of direction data of the target stroke is shifted by one (step 103e). FIG. 15, which is a diagram useful in describing the determination as to whether patterns are identical, illustrates a case in which the starting point of the array of direction data has been shifted. The initial direction-data array is "0245". When the starting point is successively shifted, the results are "2460"→"4602"→"6024"→"0246".

It is determined whether the starting point of a shifted direction-data array coincides with the starting point of the initial direction-data array (step 103f). If they do not coincide, the processing from step 103c onward is executed. In other words, it is determined whether the array of direction data after a shift agrees with the array of direction data of the basic stroke. If, when the starting point of the array of direction data has been shifted, the arrays of the direction data of the target stroke and basic stroke coincide, then it is judged that the target stroke is not a new pattern. In the case of FIG. 15, the pattern of the direction-data array indicated at (2) agrees with the pattern of the direction-data array of the basic stroke and, hence, the target stroke is judged not to be a new pattern.

However, if the arrays of direction data do not agree even after the starting point is shifted, it is judged that the target stroke and the basic stroke do not resemble each other and it is determined whether another basic stroke for which the number of attributes is the same exists (step 103g).

If such a basic stroke does not exist, then it is judged that the target stroke is a new pattern (step 103h). However, if another basic pattern for which the number of attributes is the same as that of the target stroke exists then the program returns to step 103b and the processing from this step onward is repeated.

(c) Processing for learning hint assignment (c-1) Overall processing

Figure 16:
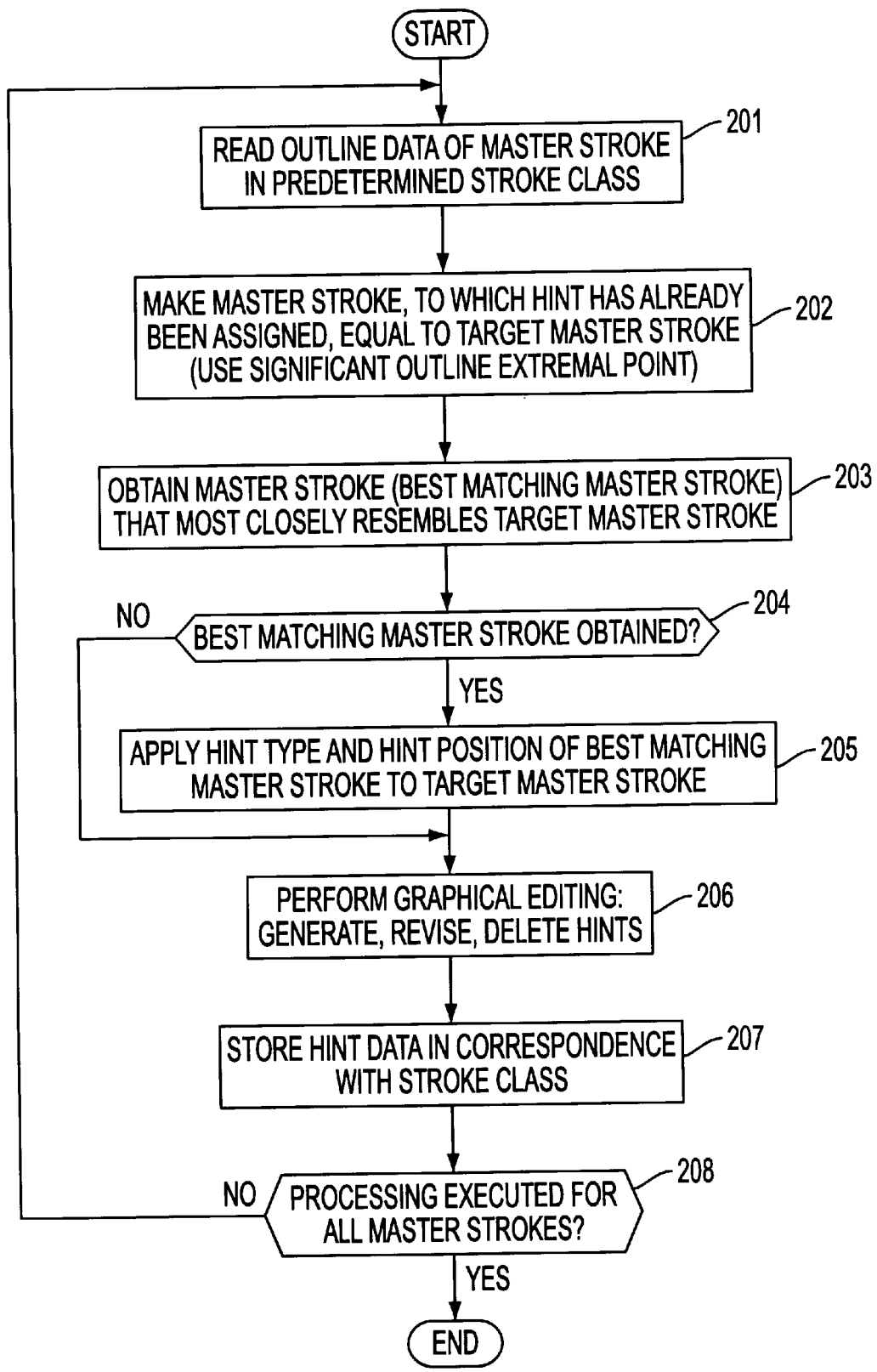
FIG. 16 shows the processing flow of a learning mode.

FIG. 16 shows the flow of processing for a case where a hint is assigned to the master stroke of each class and the stroke assignment is learned.

Outline data representing the master stroke (the target master stroke) in the target stroke class are read out of the character data base 34 (step 201). Next, the size of the master stroke to which a hint has already been assigned (initially there are no master strokes to which hints have been assigned) is made equal to the size of the target master stroke (step 202).

The equalization processing is executed using extremal points of the outline. Though the details will be described below, the general procedure for performing size equalization is as follows:

(1) Extremal points along the X and Y axes are obtained with regard to all master strokes to which hints have been assigned and with regard to the target master stroke. An extremal point is a point at which a coordinate value on a certain axis changes from a decreasing tendency to an increasing tendency or from an increasing tendency to a decreasing tendency. The former is referred to as a minimum extremal point and the latter as a maximum extremal point.

(2) Next, from among the master strokes to which hints have been assigned, master strokes having the same number of X-axis and Y-axis extremal points as the target master stroke as well as the same array of minimum and maximum extremal points are obtained.

(3) Scaling is performed in such a manner that the sizes of obtained master strokes, to which hints have been assigned, along the X and Y axes thereof will coincide with size of the target master stroke along the X and Y axes thereof, or vice versa.

When equalization processing is completed by the foregoing processing, the best matching master stroke, namely the master stroke that most closely resembles the target master stroke, is obtained from the equalized master strokes (step 203). Though processing for finding the best matching master stroke will be described later, the fundamentals are as follows: On the basis of the area of overlap between the equalized master strokes and the target master stroke, the degree of similarity between both master strokes is obtained and the master stroke, to which a hint has been assigned, having the highest degree of similarity is adopted as the best matching master stroke.

Next, it is determined whether a best matching master stroke has been obtained (step 204). In a case where there is no master stroke, to which a hint has been assigned, having the same number of X-axis and Y-axis extremal points as the target master stroke as well as the same array of minimum and maximum extremal points, this means that a best matching master stroke does not exist.

If a best matching master stroke has been obtained, the hint information (hint type, hint position) that has been assigned to the best matching master stroke is applied to the target master stroke (205). Thereafter, or if a best matching master stroke could not be obtained at step 204, hint editing (generation, revision, deletion) is performed on the control screen and the hint is assigned to the target master stroke (step 206).

If assignment of a hint to the target master stroke is finished by way of the foregoing processing, the hint information is stored in the character data base 34 to correspond to the target master stroke or stroke class (step 207).

Next, at step 208, it is determined whether processing for assigning hints to the master strokes of all classes is finished. If this processing is not finished, then processing from step 201 onward is repeated with regard to the next master stroke.

Figure 17:
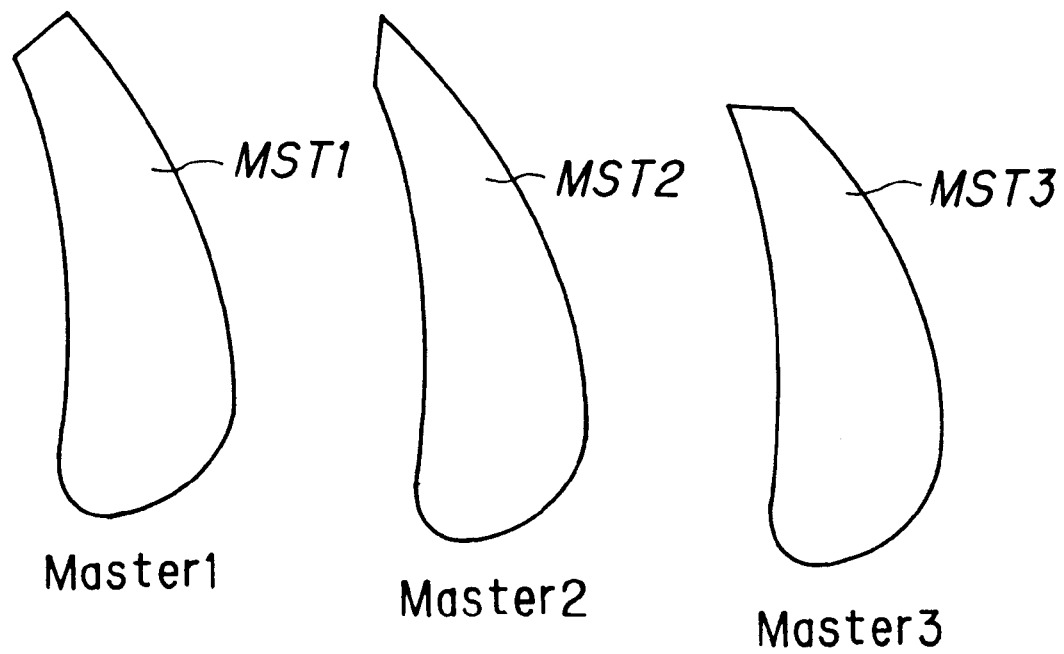
FIG. 17 is a diagram for describing learning processing.

FIG. 17 is a diagram for describing learning processing. Three master strokes MST1, MST2 and MST3 are illustrated. First, hint assignment is performed on the control screen with regard to the first master stroke MST1. Next, when a hint is to be assigned to the second master stroke MST2, the first master stroke MST1 is the best matching master stroke and therefore the hint information of the first master stroke MST1 is applied to the second master stroke MST2. If the hint information is to be revised, revision is performed on the control screen. When a hint is to be subsequently assigned to the third master stroke MST3, the best matching master stroke is obtained. Since the first master stroke MST1 is the best matching master stroke in this case, the hint information of the first master stroke MST1 is applied to the third master stroke MST3. If the hint information is to be revised, revision is performed on the control screen.

Thus, when learning of hint assignment is performed, it is possible to make use of the hint-assignment information of the best matching master stroke to which a hint has already been assigned. As a result, learning processing can be executed efficiently.

(c-2) Equalization processing

Figure 18:
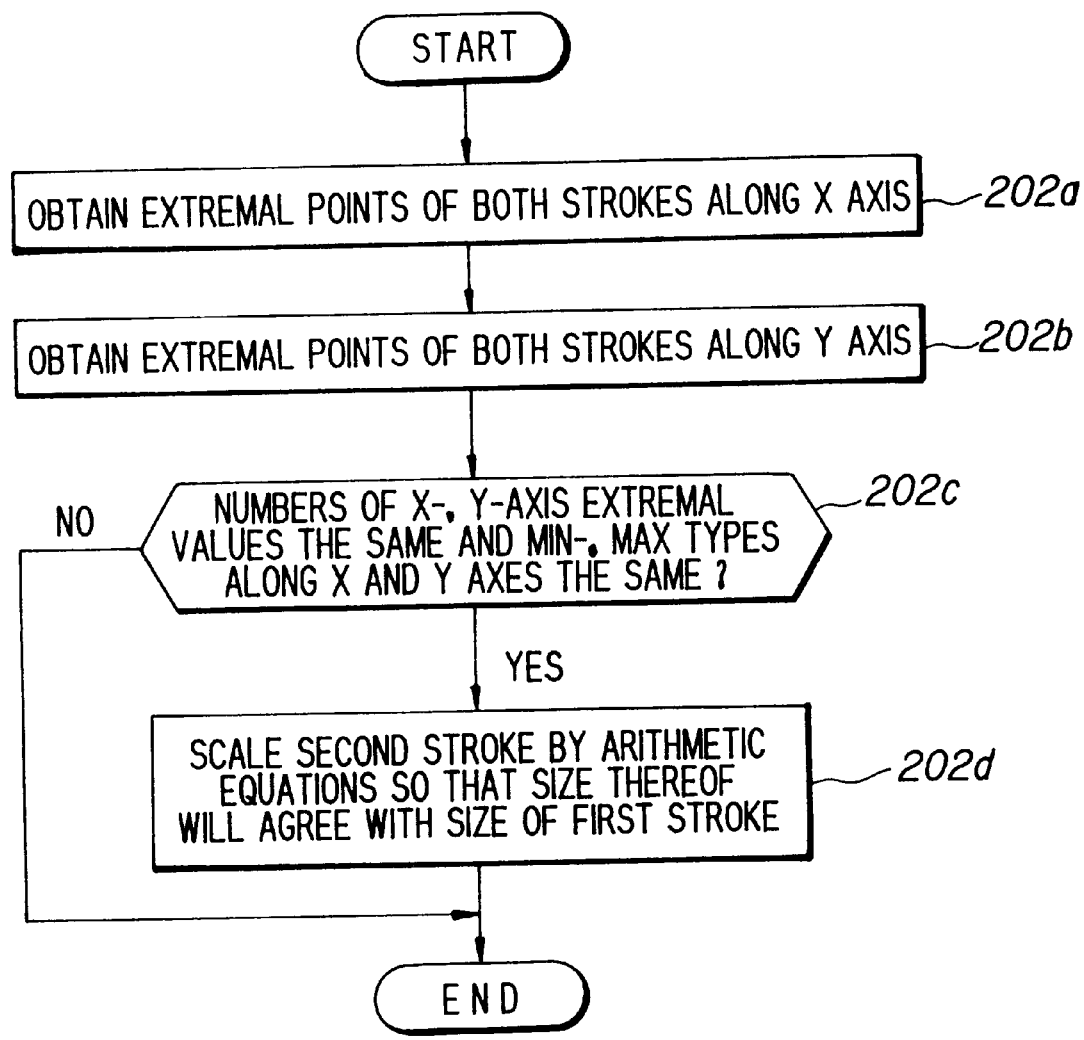
FIG. 18 shows equalization processing flow (a stroke-outline equalization algorithm)
Figure 19A:
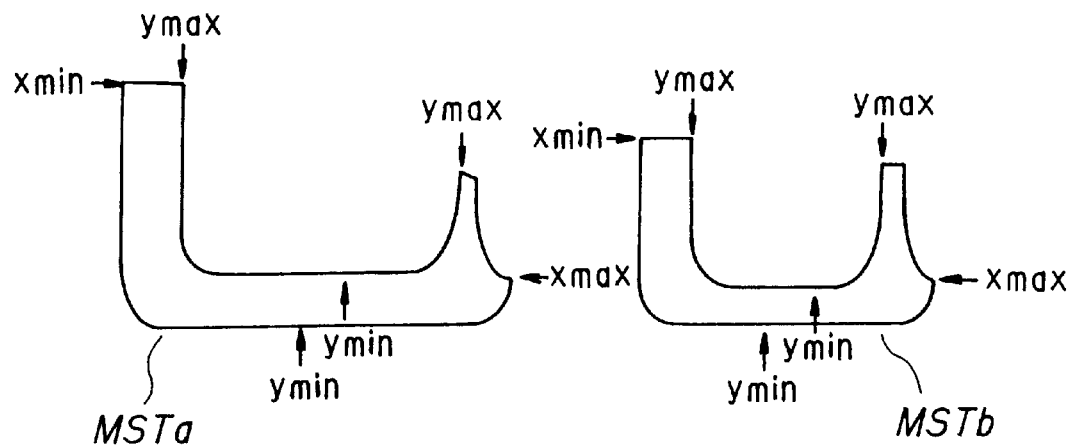
FIGS. 19A, 19B are diagrams for describing equalization processing.
Figure 19B:
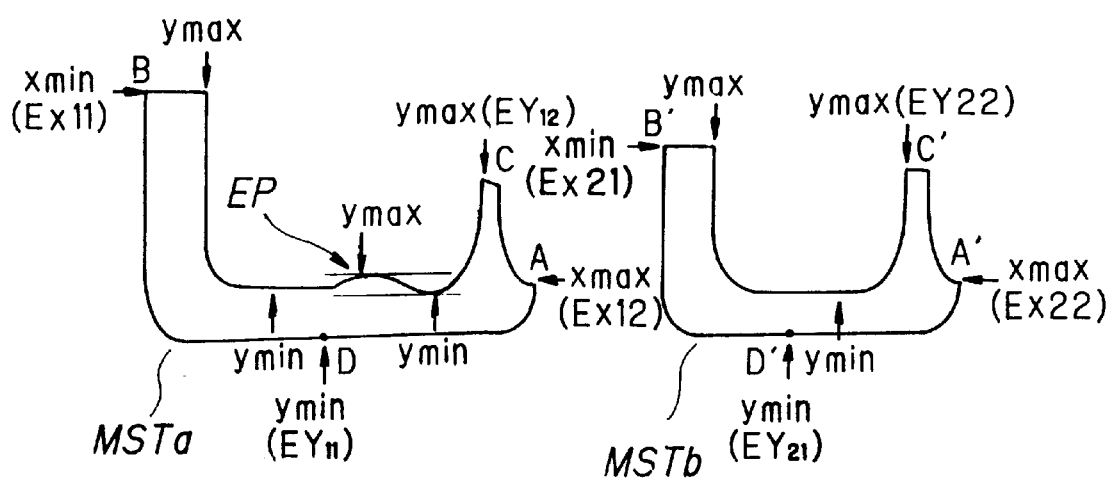
Figure 20:
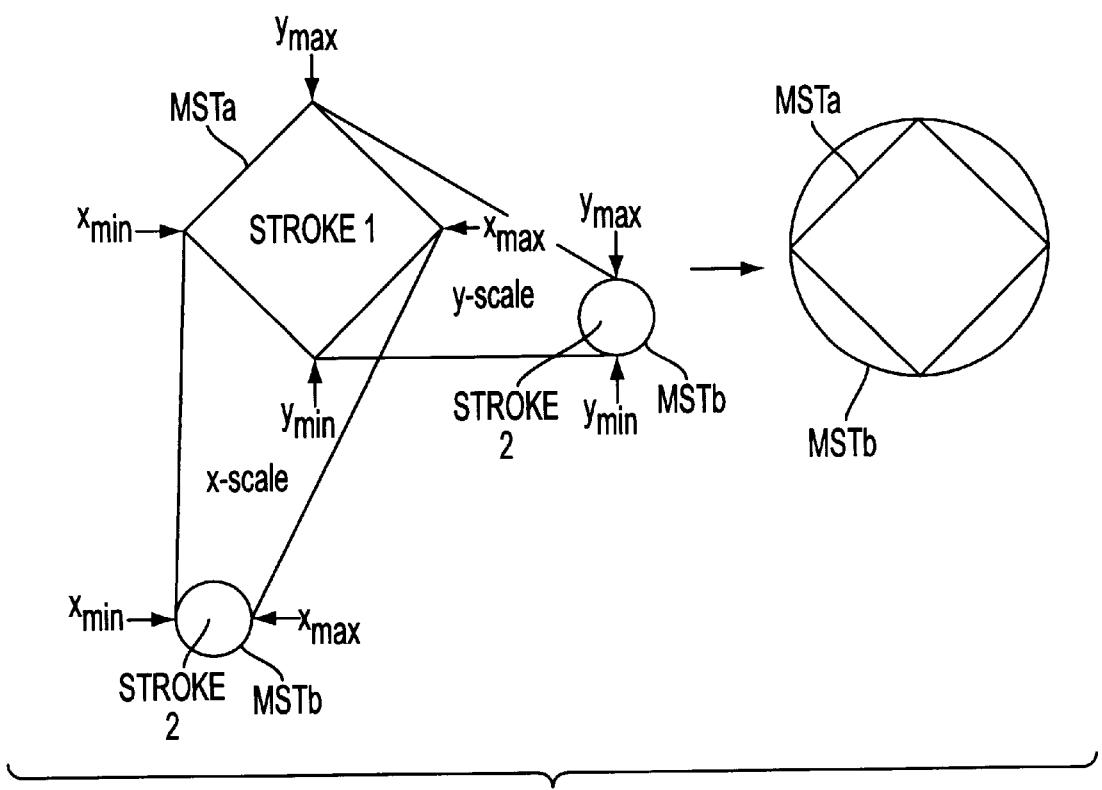
FIG. 20 is another diagram for describing equalization processing.

FIG. 18 is a flowchart of equalization processing, and FIGS. 19 and 20 are diagrams for describing equalization processing.

First, an extremal point along the X axis is obtained with regard to a master stroke MSTa, to which a hint has been assigned, and a target master stroke MSTb (see FIG. 19A) (step 202*a* in FIG. 18). Next, an extremal point along the Y axis is obtained with regard to the master stroke MSTa and target master stroke MSTb (step 202*b*). In this case, an extremal point EP for which the amount of change in coordinates from the previous extremal point is small, as shown in FIG. 19B, is a meaningless extremal point and is neglected. In other words, only significant extremal points are obtained.

Next, it is determined whether the numbers of X- and Y-axis extremal values of the master strokes MSTa, MSTb are the same and whether the arrays of extremal points of these two strokes are the same (step 202*c*). The expression "array of extremal points" has the following meaning: Let Xmax represent an extremal point, from among the extremal points along the X axis, whose coordinate value changes from an increasing value to a decreasing value, let Xmin represent an extremal point, from among the extremal points along the X axis, whose coordinate value changes from a decreasing value to an increasing value, let Ymax represent an extremal point, from among the extremal points along the Y axis, whose coordinate value changes from an increasing value to a decreasing value, and let Ymin represent an extremal point, from among the extremal points along the Y axis, whose coordinate value changes from a decreasing value to an increasing value. The array of extremal points will be the array Xmax, Xmin, Ymax, Ymin that appears along the outline of the stroke.

If the numbers of extremal points along the X and Y axes of the two strokes are not the same, or if the arrays of extremal points are not the same, this means that the master stroke MSTa is excluded as a candidate for best matching master stroke. Accordingly, processing is terminated without applying a scaling operation.

On the other hand, if the numbers of extremal points along the X and Y axes of the two strokes are the same and, moreover, the arrays of extremal points are the same, then size scaling processing is executed and the sizes of the two strokes along each axis are made to coincide (step 202*d*).

The scaling operation is performed between corresponding extremal points. For example, as shown in FIG. 19B, let $EX_{12}$, $EX_{11}$ represent the coordinates of extremal points A, B, respectively, of the master stroke MSTa along the X axis, and let $EX_{22}$, $EX_{21}$ represent the coordinates of extremal points A', B', respectively, of the master stroke MSTb along the X axis. The X coordinate value of each contour point (x',y') between A' and B' of the master stroke MSTb is scaled by the following equation:

$$x = EX_{11} + (x' - EX_{21}) \cdot (EX_{12} - EX_{11})/(EX_{22} - EX_{21}) \qquad (1)$$

Similarly, as shown in FIG. 19B, let $EY_{12}$, $EY_{11}$ represent the coordinates of extremal points C, D, respectively, of the master stroke MSTa along the Y axis, and let $EY_{22}$, $EY_{21}$ represent the coordinates of extremal points C', D', respectively, of the master stroke MSTb along the Y axis. The Y coordinate value of each contour point (x',y') between A' and C' of the master stroke MSTb is scaled by the following equation:

$$y = EY_{11} + (y' - EY_{21}) \cdot (EY_{12} - EY_{11})/(EY_{22} - EY_{21}) \qquad (2)$$

FIG. 20 is a diagram for describing a case where the size of the target master stroke MSTb, which is a circular stroke, is made equal to the size of the master stroke MSTa, which is square. The sizes of the circular target master stroke MSTb along the X and Y axes are scaled by Equations (1), (2), respectively, so as to become identical with the sizes of the master stroke MSTa along the X and Y axes.

(c-3) Processing for discovering best matching master stroke

Figure 21:
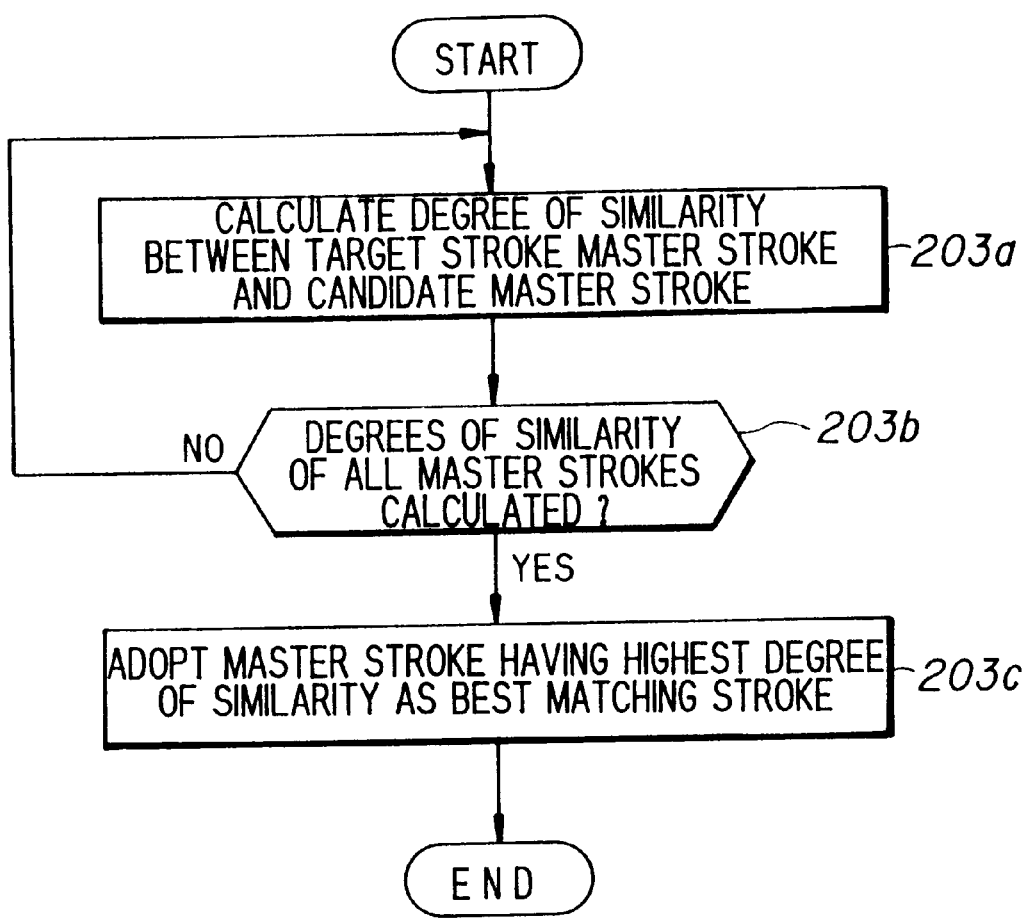
FIG. 21 shows the flow of processing for discovering a best matching master stroke.
Figure 22:
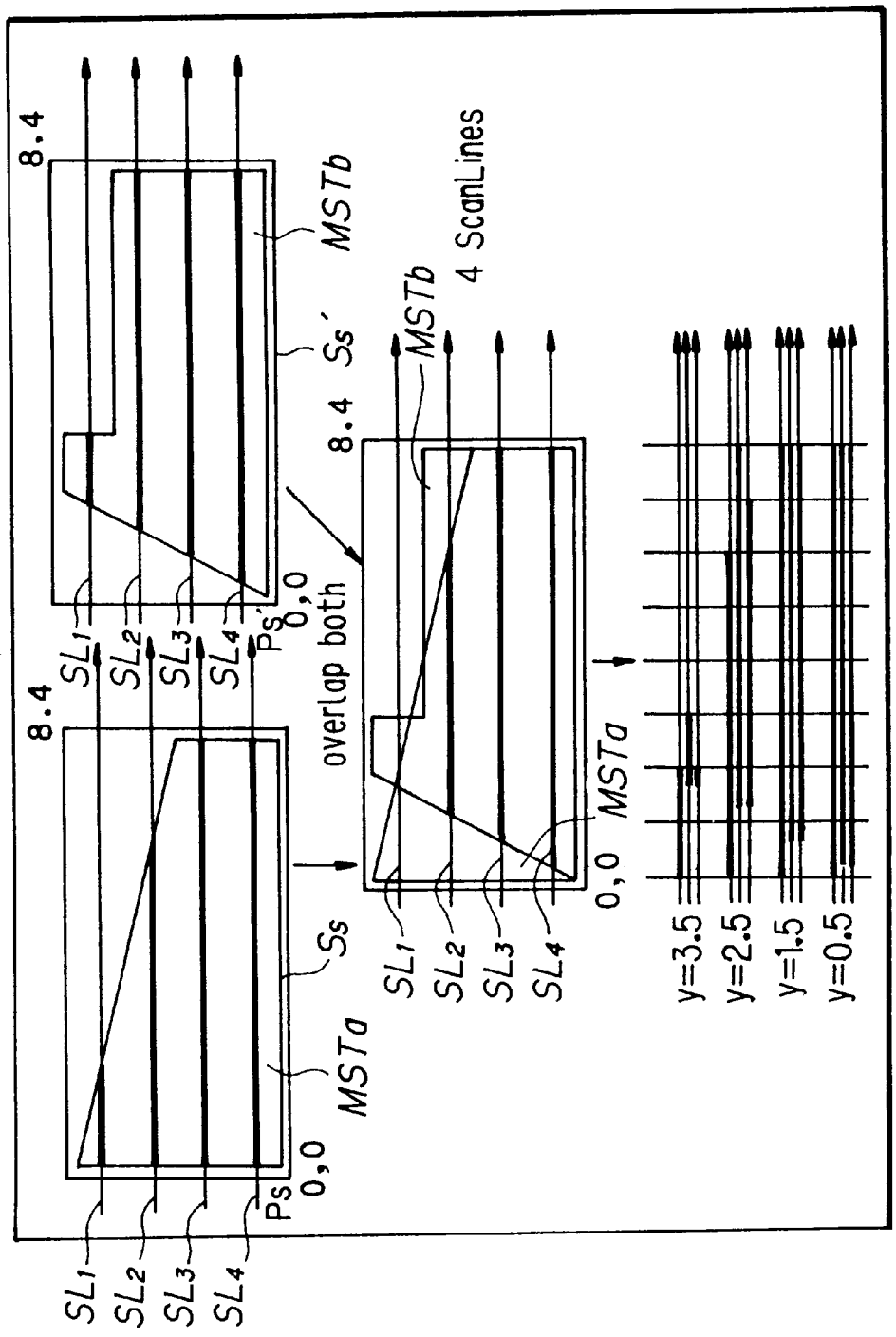
FIG. 22 is a diagram for describing processing for discovering a best matching master stroke.
Figures 23, 24:
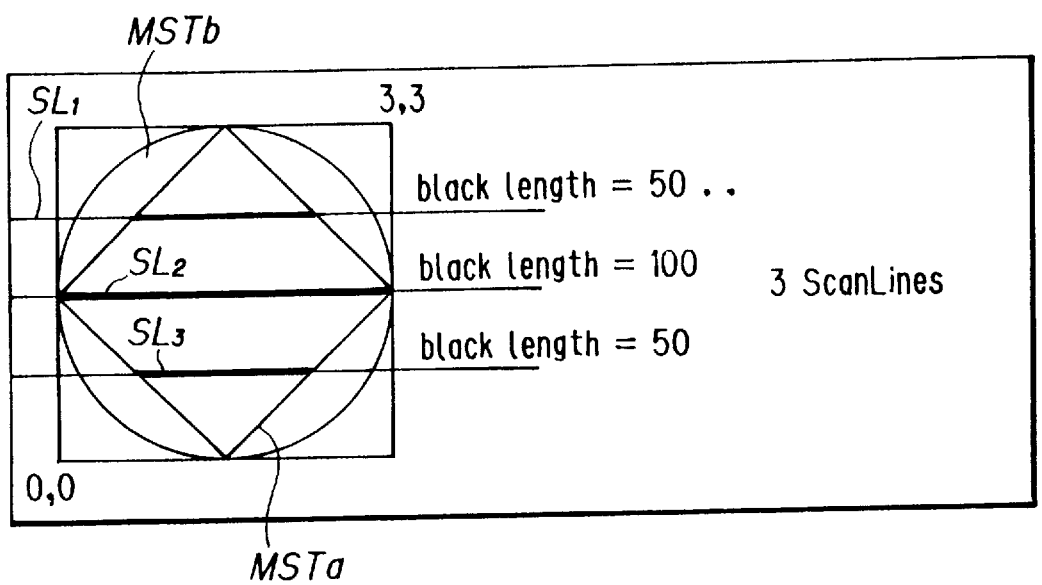
FIG. 23 is a diagram for describing the area and overlapping area of each master stroke.
FIG. 24 is another diagram for describing processing for discovering a best matching master stroke.

FIG. 21 shows the flow of processing for discovering a best matching master stroke, FIG. 22 is a diagram for describing processing for discovering a best matching master stroke, and FIG. 23 is a diagram for describing the area and overlapping area of each master stroke.

In finding a best matching master stroke, first the degree of similarity between the target master stroke and a candidate master stroke is calculated (step 203*a*). Degree of similarity is calculated through the following procedure:

(1) First, single corresponding points Ps, Ps' on the size-equalized master stroke MSTa (see FIG. 22), to which a hint has been assigned, and on the target master stroke MSTb, respectively, and single segments Ss, Ss' having the corresponding points Ps, Ps' as their end points are superimposed, and the interior of each stroke is scanned along scanning lines $SL_1$, $SL_2$, $SL_3$ . . . having a predetermined spacing (the spacing along the Y axis in FIG. 22 is 1.0). The overlapping of the strokes is actually performed by overlapping the corresponding points and corresponding segments in the same coordinate system. (2) Next, the lengths of the scanning lines $SL_1$, $SL_2$, $SL_3$ . . . within each of the master strokes MSTa, MSTb are summed and the sum of the scanning-line lengths in each element is adopted as the area of the element. Further, the lengths of the scanning lines in the overlapping portions of the master strokes MSTa, MSTb are summed and the sum is adopted as the area of overlap. (3) Finally, the area of overlap is divided by the sum of the areas of the two master strokes, thereby obtaining the normalized area. The normalized area is adopted as the degree of similarity. When it is determined that the degrees of similarity of all master strokes have been calculated (step 203*b*), the master stroke having the highest degree of similarity is adopted as the best matching stroke (step 203c).

The table of FIG. 23 indicates (1) starting and end points of intersection between the master strokes MSTa, MSTb and each of the scanning lines $SL_1$, $SL_2$, $SL_3$, $SL_4$, . . . (2) starting and end points of overlap, (3) sum totals of the lengths of the scanning lines within the master strokes MSTa, MSTb, (4) sum total of the lengths of the scanning lines within the overlap, and (5) degree of similarity (normalized area).

FIG. 24 is a diagram for describing degree of similarity in a situation where the spacing between the scanning lines is widened to reduce the number of scanning lines. The lengths (indicated by the bold lines) of three scanning lines $SL_1$, $SL_2$, $SL_3$ in the portion of overlap between the master strokes MSTa, MSTb are 50, 100, 50, respectively, and the total lengths of the scanning lines within the master strokes MSTa, MSTb are 200, 273, respectively. Accordingly, the degree of similarity is 200/(200+273)=0.85. If the number of scanning lines is increased to calculate a more accurate degree of similarity, the result is 0.64. However, by widening the spacing of the scanning lines to reduce the number thereof, the time needed to calculate the degree of similarity can be shortened.

(d) Automatic hint processing
(d-1) Overall processing

Figure 25:
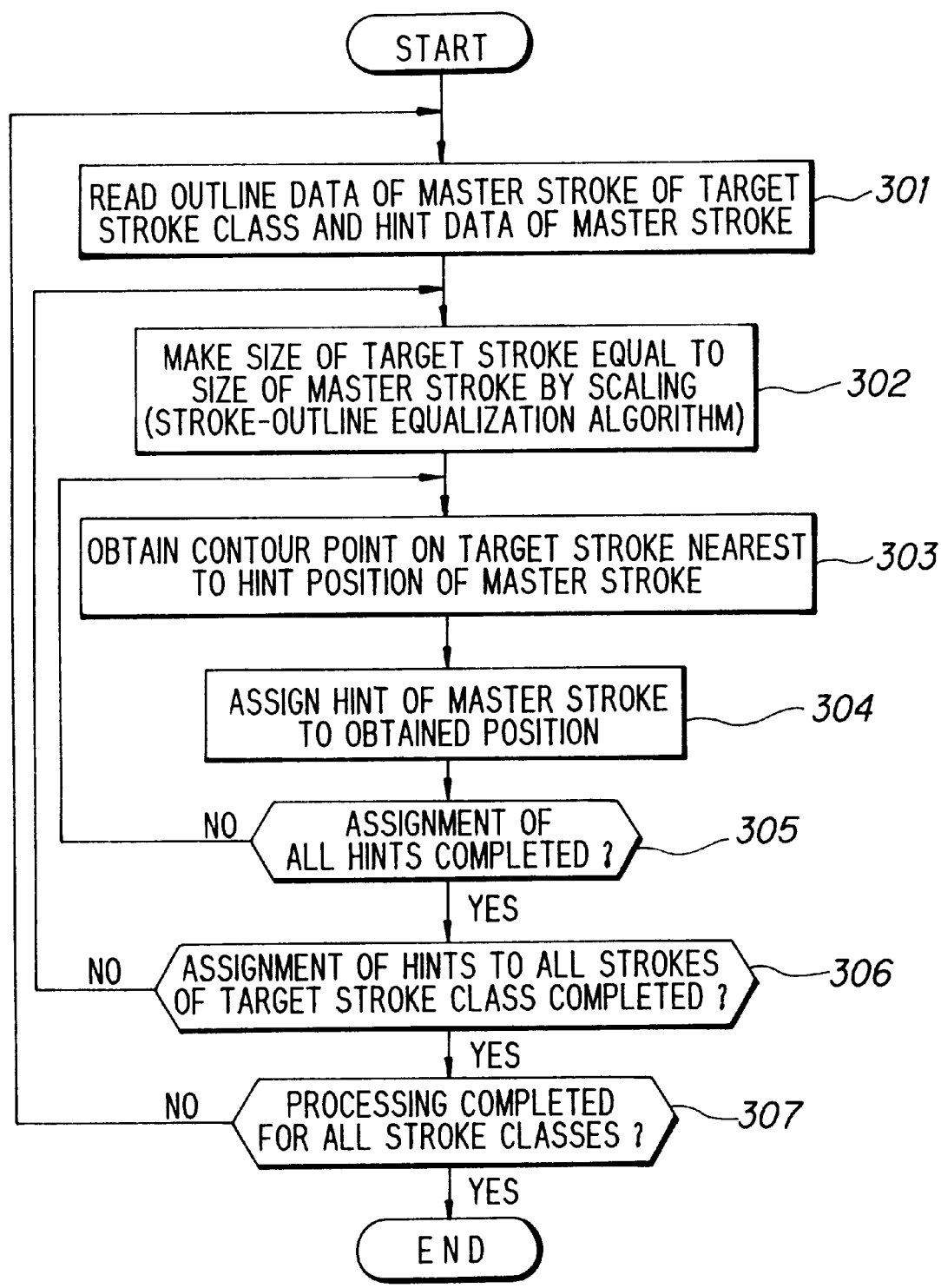
FIG. 25 illustrates automatic hinting processing.

FIG. 25 is a flowchart showing the entirety of automatic hint processing.

If learning is finished, hints are assigned to all strokes automatically using the hint information that has been assigned to the master stroke of each class.

First, the outline data of the master stroke in the target stroke class and the hint data of this master stroke are read (step 301). Next, the outline data of a predetermined stroke (target stroke) belonging to the target master class are read and the size of the target stroke is made equal to the size of the master stroke (step 302).

Thereafter, the two corresponding points of the target stroke and master stroke are overlapped and an outline contour point of the target stroke nearest to a predetermined hint position of the master stroke is obtained (step 303). If the nearest contour point is obtained, the hint type that was assigned to the above-mentioned hint position of the master stroke is applied to this contour point (step 304). Next, it is determined whether all hint information of the master stroke has been applied to the target stroke (step 305). If the answer is "NO", then the processing from step 303 onward is repeated with regard to the next item of hint information.

If the automatic assignment of hints to the target stroke is finished, then it is determined whether hint assignment processing has been completed for all strokes of the target stroke class (step 306). If the answer is "NO", then the processing from step 302 onward is repeated for the next stroke. If the above-mentioned processing has been completed for the target stroke class, it is determined whether hint assignment processing has been completed for all stroke classes (step 307). If the answer is "NO", then the processing from step 301 onward is repeated for the next stroke class.

(d-2) Equalization processing

Figure 26:
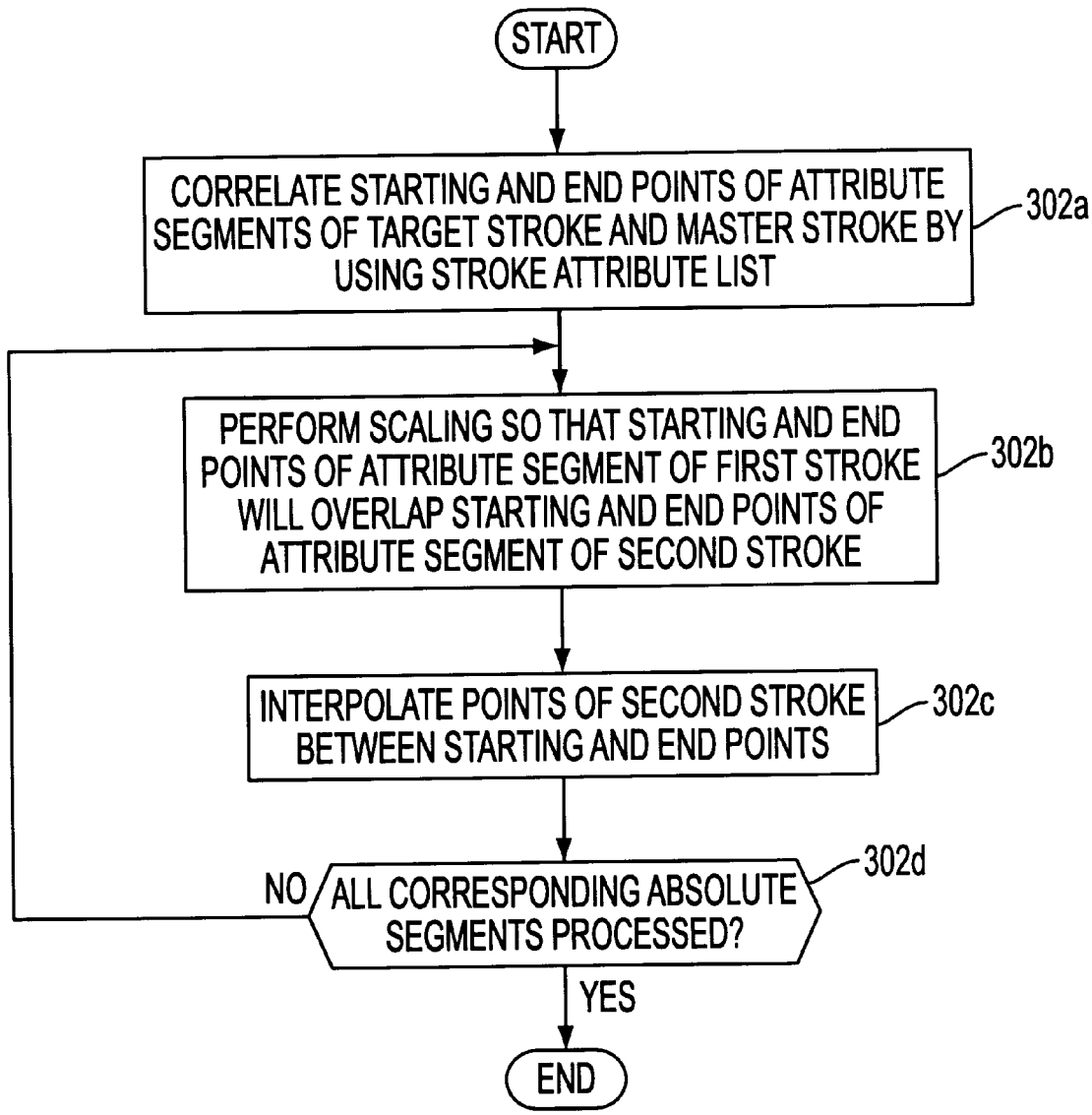
FIG. 26 shows a stroke-outline equalization algorithm.

FIG. 26 is a flowchart of the equalization processing of step 302, and FIGS. 27A, 27B, 28A, 28B are diagrams for describing equalization processing.

Figure 27A:
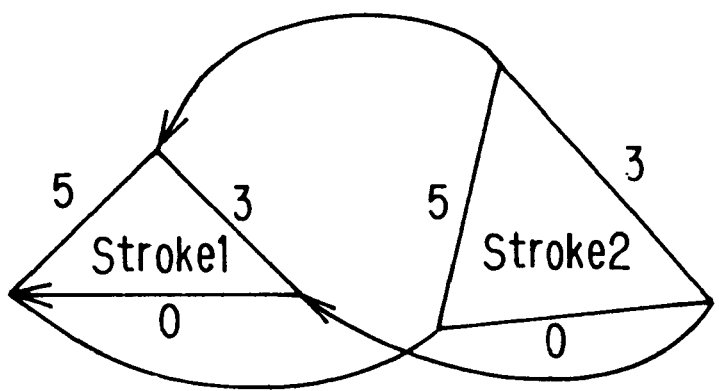
FIGS. 27A, 27B are diagrams for describing correlation of attribute segments.
Figure 27B:
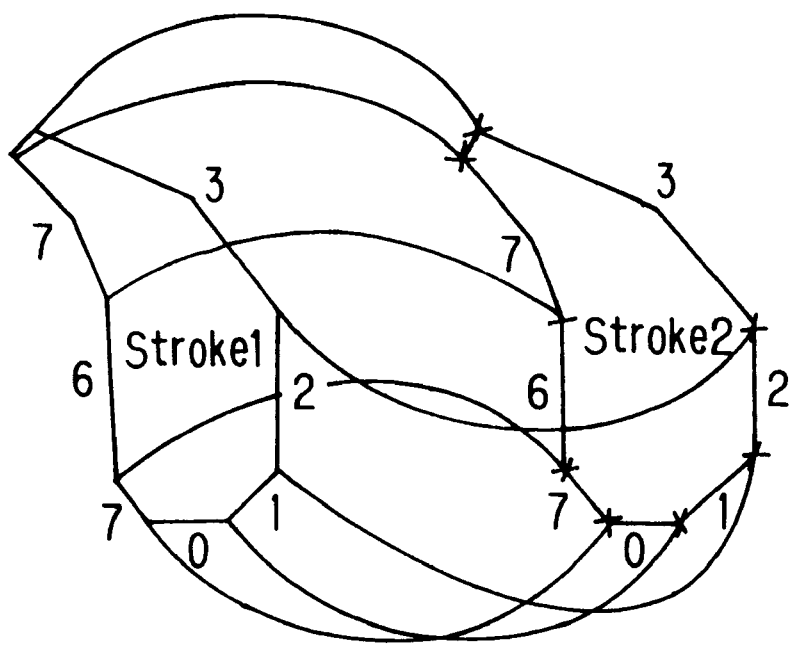

In equalization processing, first reference is made to the stroke attribute lists of the master stroke and target stroke and the starting and end points of all attribute segments of these two strokes are correlated (step 302a). FIGS. 27A, 27B illustrate the correlation between the starting and end points of the attribute segments of a target stroke (Stroke 2) and master stroke (Stroke 1).

Next, scaling equations similar to Equations (1), (2) are obtained in such a manner that the starting and end points of a predetermined attribute segment of the target stroke will overlap the starting and end points of the corresponding attribute segment of the master stroke, and the starting and end points of the attribute segment of the target stroke are scaled by these equations (step 302b). Further, an outline contour point of the target stroke residing between the starting and end points of the attribute segment is scaled and interpolated by the above-mentioned equations (step 302c).

Thereafter, it is determined whether processing has been completed for all corresponding attribute segments (step 302d). If this processing has not been completed, then the processing from step 302b onward is repeated for the next attribute segment.

Figure 28A:
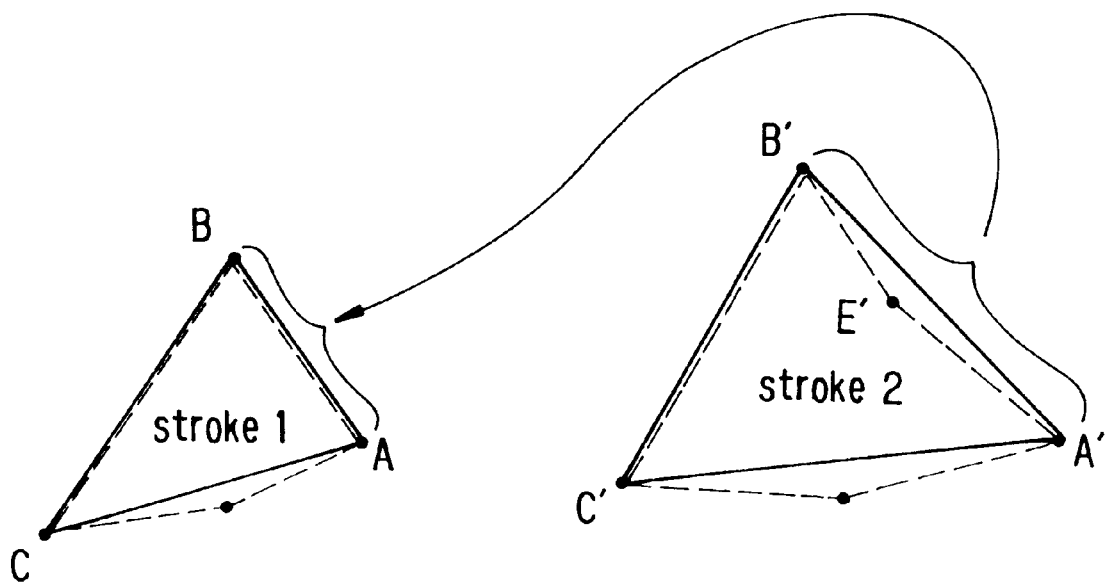
FIGS. 28A, 28B are diagrams for describing scaling.
Figure 28B:
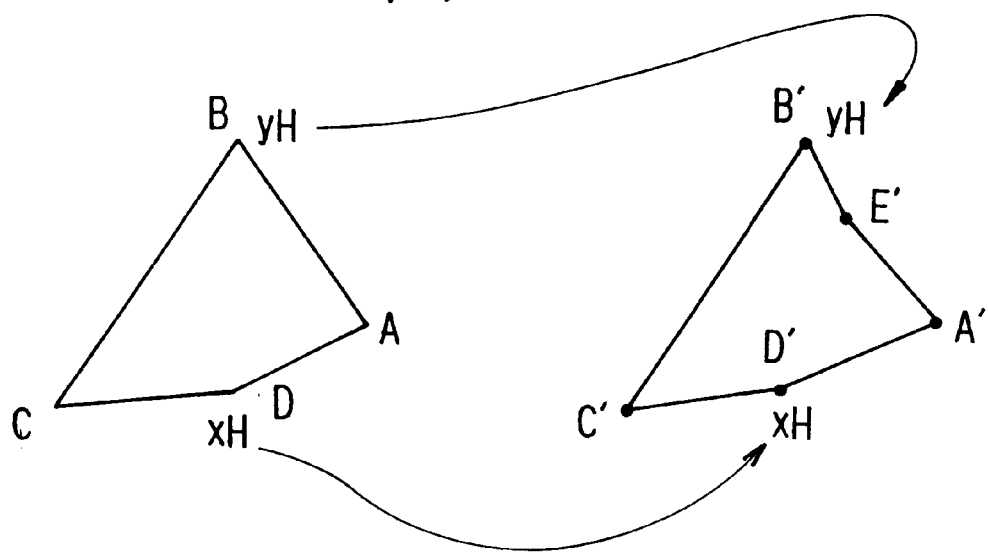

FIG. 28A is a diagram for describing scaling. The dashed lines indicate the outlines of the respective strokes. The scaling equations are derived in such a manner that an attribute segment A'B' of the target stroke (Stroke 2) will overlap the corresponding attribute segment AB of the master stroke (Stroke 1). These equations have the same form as Equations (1), (2). Next, the starting point A' and end point B' of the target stroke (Stroke 2) and a contour point E' residing between the points A', B' are scaled. Similarly, scaling is performed with regard to the other attribute segments B'C' and C'A'. When this is done, the outline of the target stroke (Stroke 2) takes on the shape shown on the right side of FIG. 28B. The left side of FIG. 28B is the outline of the master stroke.

If size equalization is completed in the manner described above, the two corresponding points A, A' and C, C' of the target stroke and master stroke (FIG. 28B) are superimposed and the outline contour points of the target stroke nearest to respective ones of the predetermined hint positions B, D of the master stroke are obtained. When this is done, the contour points obtained are B' and D'. Accordingly, a hint yH, which was assigned to point B of the master stroke, is applied to the contour point B' of the target stroke, and a hint xH, which was assigned to point D of the master stroke, is applied to the contour point D' of the target stroke.

Thus, if character elements (strokes or parts) whose shapes are similar and to which identical hint information is assigned are divided into classes automatically, a hint is assigned solely to the master element of each class by operator operation and the system is made to learn the assignment of the hint, then the system can subsequently assign hints to other elements (strokes or parts) automatically. As a result, hints can be assigned to character elements semi-automatically in an efficient manner.

(D) Method of constructing font file
(a) Font file architecture

FIG. 29 is a diagram showing the architecture of a font file created by a font file creation program. It should be noted that the outline of a character is cut into strokes, the strokes are cut into parts and the font of each character is expressed by a collection of its parts.

In FIG. 29, numeral 51 denotes a font file, which includes (1) a font header 61, (2) a font table 62, (3) a directory 63 for character coding, (4) a character header section 64 and (5) a part group section 65.

(b) Font header

The font header 61 describes general-purpose information such as a copyright indication, font size, outline data resolution, number of usable characters and offset values to various font tables. The size of the font header is very small in comparison with the rest of the font file.

(c) Font table

The font table 62, which is common to all characters, describes an overall control table, a character coding table, a stem width table, a character map table and a hint table, etc. The only table that has a bearing upon the present invention is the hint table. As shown in FIG. 30, the hint table, which is indicated at 62a, describes hint-type lists HTL1~HTLn, which correspond to part groups 1~n, described later.

The hint-type list HTLi contains types of hints (curve hints, mark hints, scale hints, etc.), which are assigned to the outlines of parts, arrayed in regular in the-counter-clockwise direction along the outline. FIG. 30 illustrates a hint-type list for a case in which hints are arrayed in the order mark hint→mark hint curve→hint→curve hint in the counter-clockwise direction along the outline.

(d) Director for character coding

The directory 63 for character coding stores offset values with respect to individual character codes in accordance with a designated coding method. In other words, the character coding directory 63 stores offset values indicating positions at which character headers conforming to the character codes have been stored.

(e) Character header

The character header section 64 stores, for every character, the positions of outline data of the parts (first through nth parts) constructing the character. The character header of each character has, for every part, (1) a part position offset PPO, (2) a part group position (part group offset PGO), to which the part belongs, and (3) outline data position (part outline index POI) of the part in the group.

The part position offset PPO offsets the position at which the origin of a part is disposed. Though a standard part position is obtained from the BSF file (basic stroke file), offsetting the origin of the part in dependence upon the style of type makes it possible to obtain better character quality. Accordingly, the amount of offset of a part origin position is designated by the part position offset PPO.

The part group offset PGO designates the position of a part group to which a part belongs. In the font file of this invention, parts having similar shapes are divided into groups and the outline information of the respective parts is stored collectively according to group. Accordingly, the position of a part group is designated by this part group offset PGO, and the outline data position of a part in the group is designated by the next part outline index POI.

(f) Part group (f-1) Constitution

The part group section 65 is composed of part groups 65a, 65b, 65c, in a case where parts having similar shapes are divided into groups. Each part group includes (1) a header GHD for recording data common to each part belonging to the group, (2) a control data section CDT for recording outline data condensing information and part hint-position information, and (3) an outline data section OLN for storing condensed outline data of each part. The outline data section OLN has a part outline block POBi (i=1, 2, . . . n) which describes the condensed outline data of each part belonging to the group. The part outline blocks POBi are arrayed in order of decreasing rate of appearance (rate of utilization). As a result, high-speed access is possible.

(f-2) Group header

The group header GHD describes (1) an offset value HOF (see FIG. 30) within a hint table up to hint-type list HTLi of the part group, (2) the block length of the control data section, and (3) the block length BL of the part outline block. The hint-type list HTLi is shared by each part of the part group. Consequently, parts having different hint information are not classified into the same part group. Further, the block length BL of the part outline block also is shared by each part, and parts having different condensed outline-data lengths, described later, are not classified into the same group. Part group position is designated by the part group offset PGO, and the block number b within group is designated by the part outline index POI, thereby making it possible to read out part outline data at high speed.

(f-3) Control data

The control data section CDT describes (1) outline-data condensing information, and (2) part hint-position information.

Condensing of outline data

A part outline can be written as a number of contour points. Methods of writing an outline include a method of generating a quadratic or cubic spline curve or a Bézier curve, a method of successively connecting two adjacent points, etc. In order to achieve a simple form of writing an outline, the position of a contour point is defined in an X, Y coordinate system of whole numbers, and the positions of adjacent control points are expressed by a short vector between the control points.

A short vector can be specified by increments (dx,dy) along the respective axes. In order to express a vector of maximum length, 16 bits are required for each of dx and dy, for a total of four bytes. If all vectors were to be expressed by four bytes, the amount of memory capacity used would be very large. With a short vector, only four bits are needed for each of dx and dy, meaning that a total of one byte is sufficient. This means that if the type of outline vector is known, a short vector can be expressed by one byte, a vector of medium length by two bytes and a long vector by four bytes, thus making it possible to condense the outline data.

FIG. 31 is a diagram for describing the types of vectors connecting adjacent contour points. The types of vectors are types 0~5 and are decided upon taking into account (a) whether the vector is horizontal, vertical or oblique, and (b) the length of the vector.

(1) Type 0 is a vector for a case in which two adjacent points overlap each other. A vector of this type is virtually non-existent.

(2) Type 1 is a vector whose length can be expressed by four bits for each of dx and dy, for a total of one byte.

(3) Type 2 is a vertical vector for which dx=0 holds. The length thereof can be expressed by eight bits for dy.

(4) Type 3 is a horizontal vector for which dy=0 holds. The length thereof can be expressed by eight bits for dx.

(5) Type 4 is an oblique vector whose length can be expressed by eight bits for each of dx and dy, for a total of one byte.

(6) Type 5 is a vector whose length can be expressed by 16 bits for each of dx and dy.

Thus, the dx-/dy-type of each vector constituting the outline of a part is expressed by the condensing information in the control data section CDT. If this arrangement is adopted, vectors can be expressed in proper data lengths conforming to vector direction and length. As a result, the size of the font file can be decreased (the outline data can be condensed). Moreover, data length can be recognized upon taking into account the type of each segment when the outline data are read, and the outline information can be read out correctly. Furthermore, the condensing information is data shared by all parts of the part group, and a part group is constructed of parts whose vector type arrays are the same.

Figure 32:
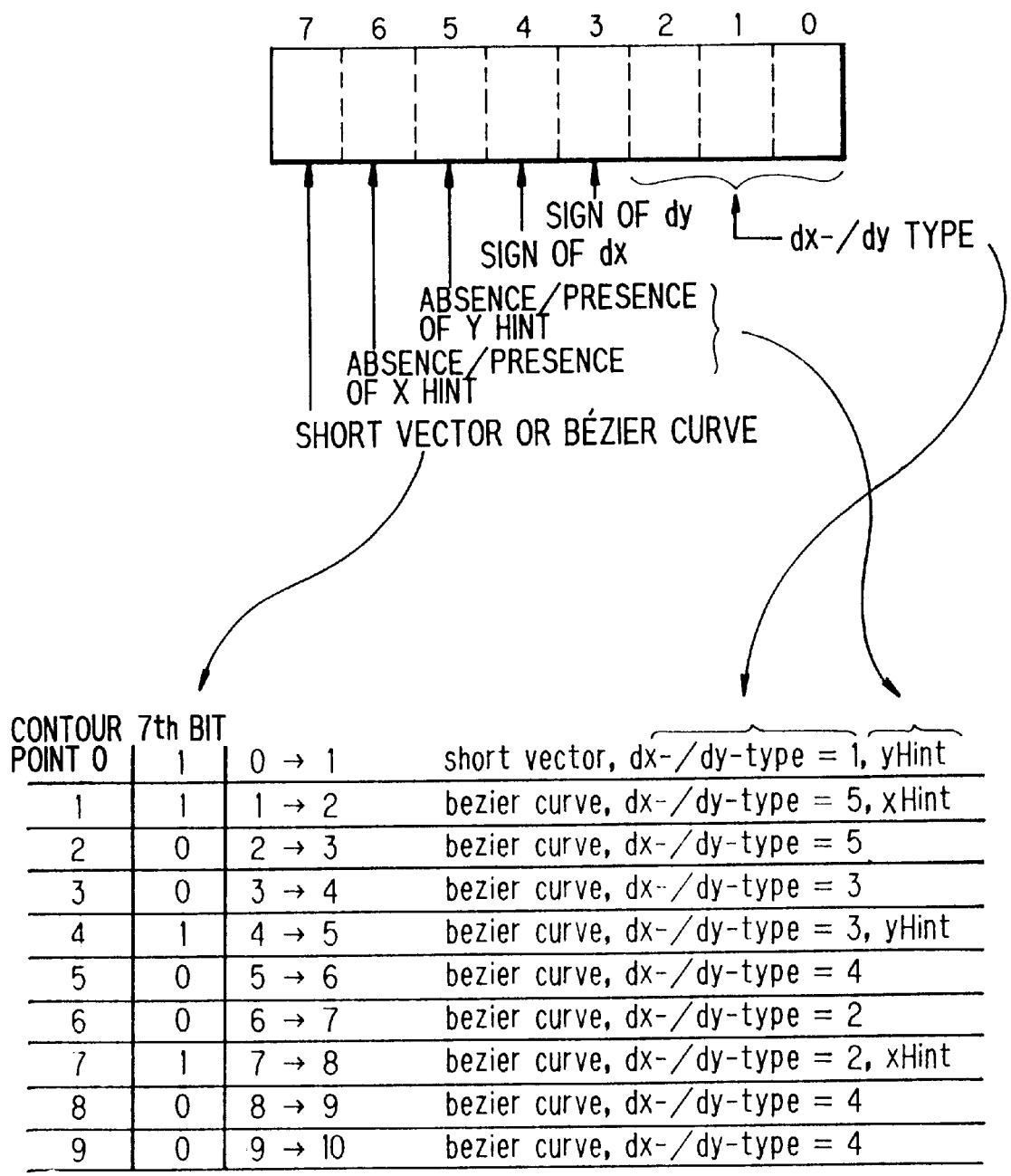
FIG. 32 shows the structure of control data.
Figure 33:
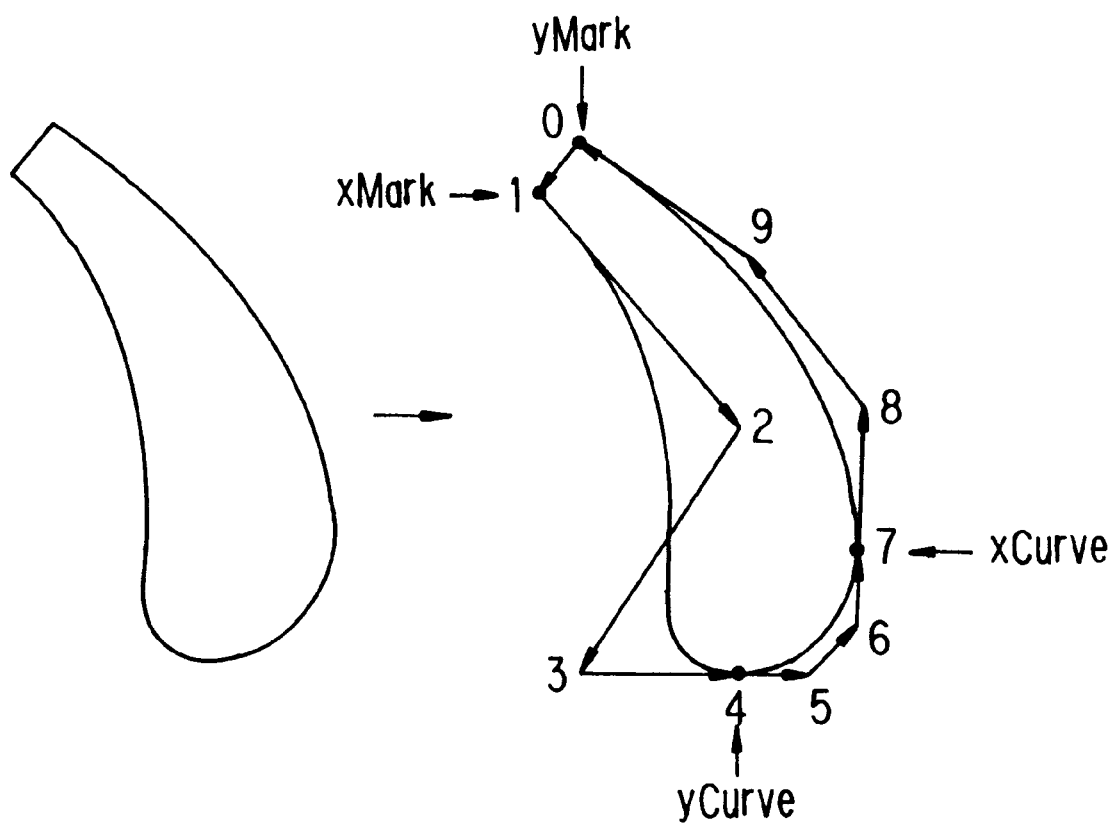
FIG. 33 is a diagram for describing the outline of a part.
Figure 34:
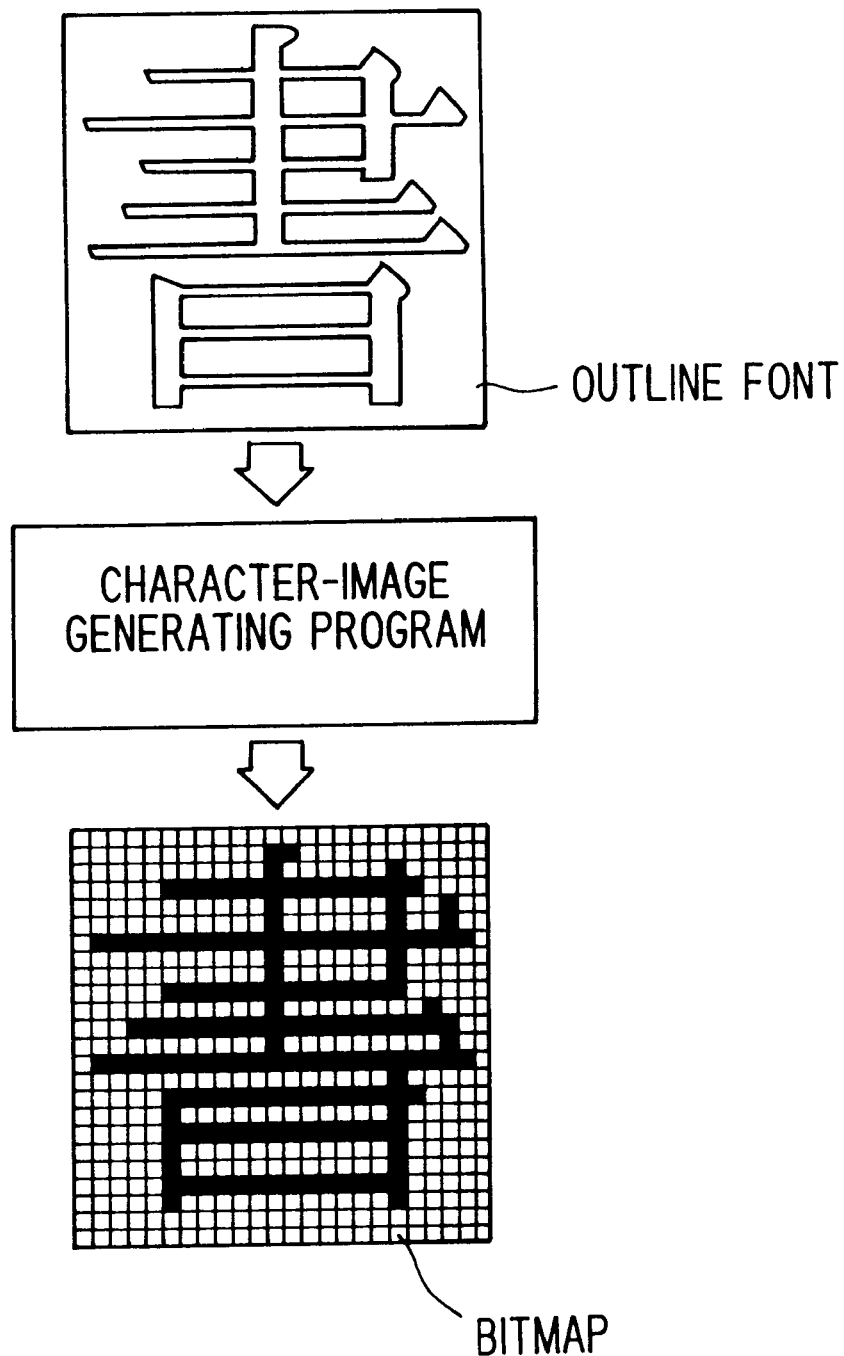
FIG. 34 is a diagram for describing an outline font.
Figure 36:
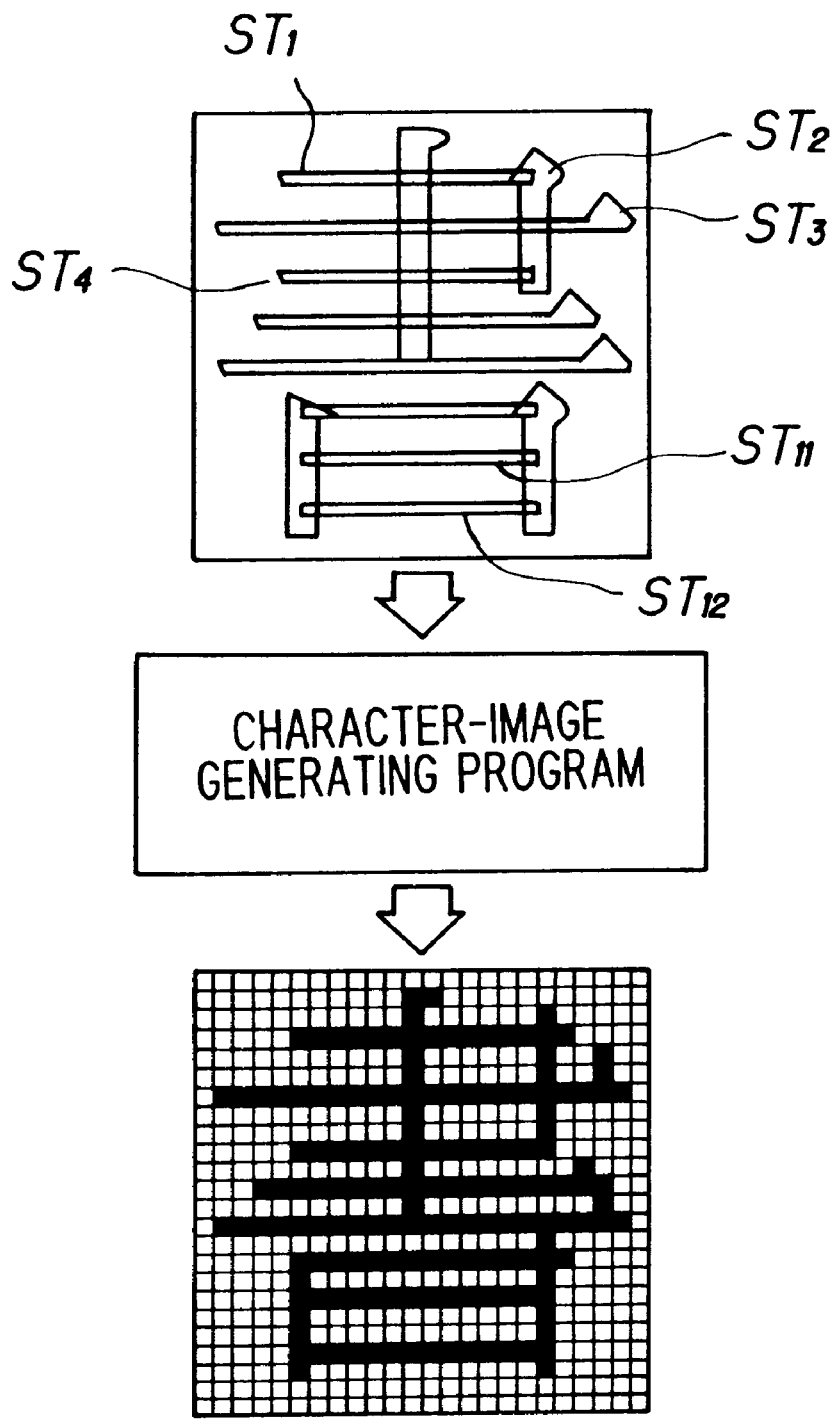
FIG. 36 is a diagram for describing an outline font to which the present invention is applied.
Figure 37:
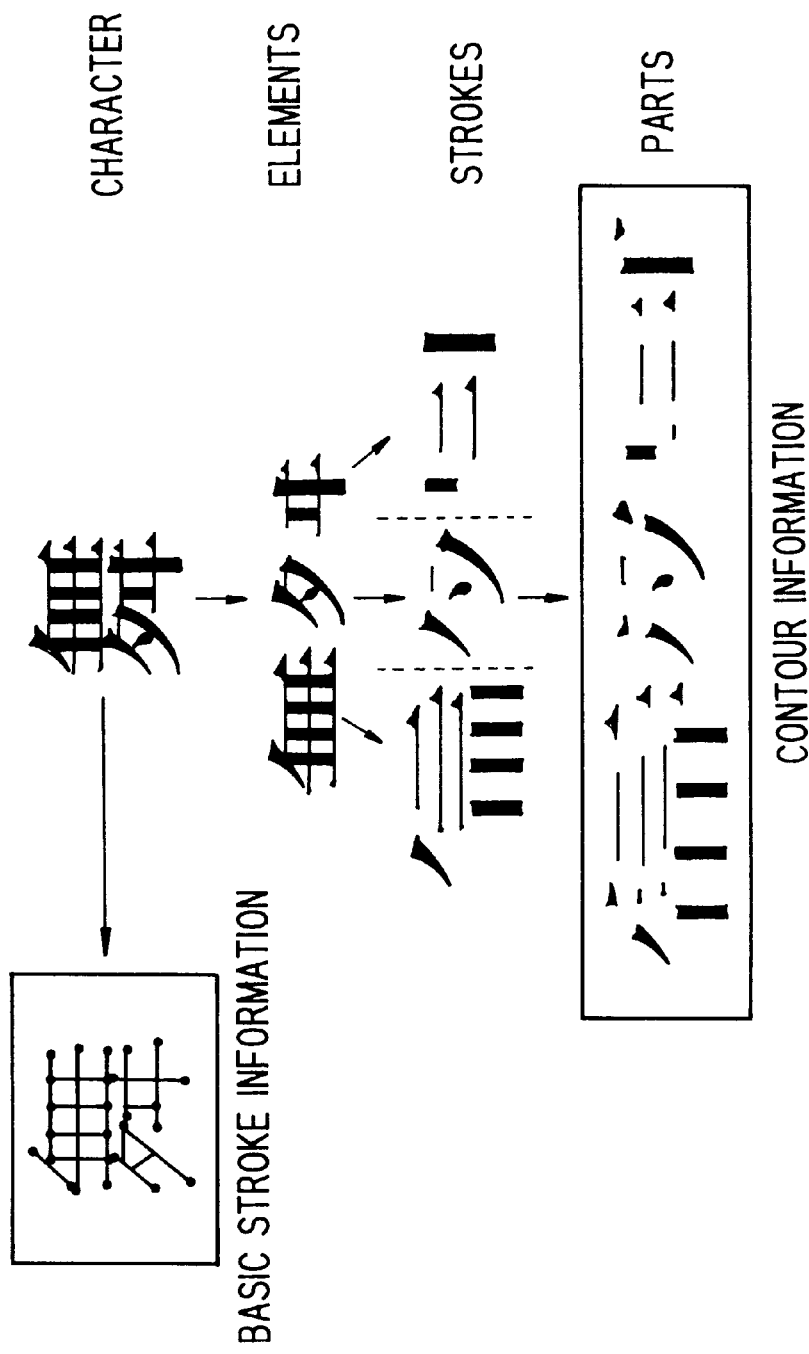
FIG. 37 is a diagram for describing a character, strokes and parts.
Figure 38:
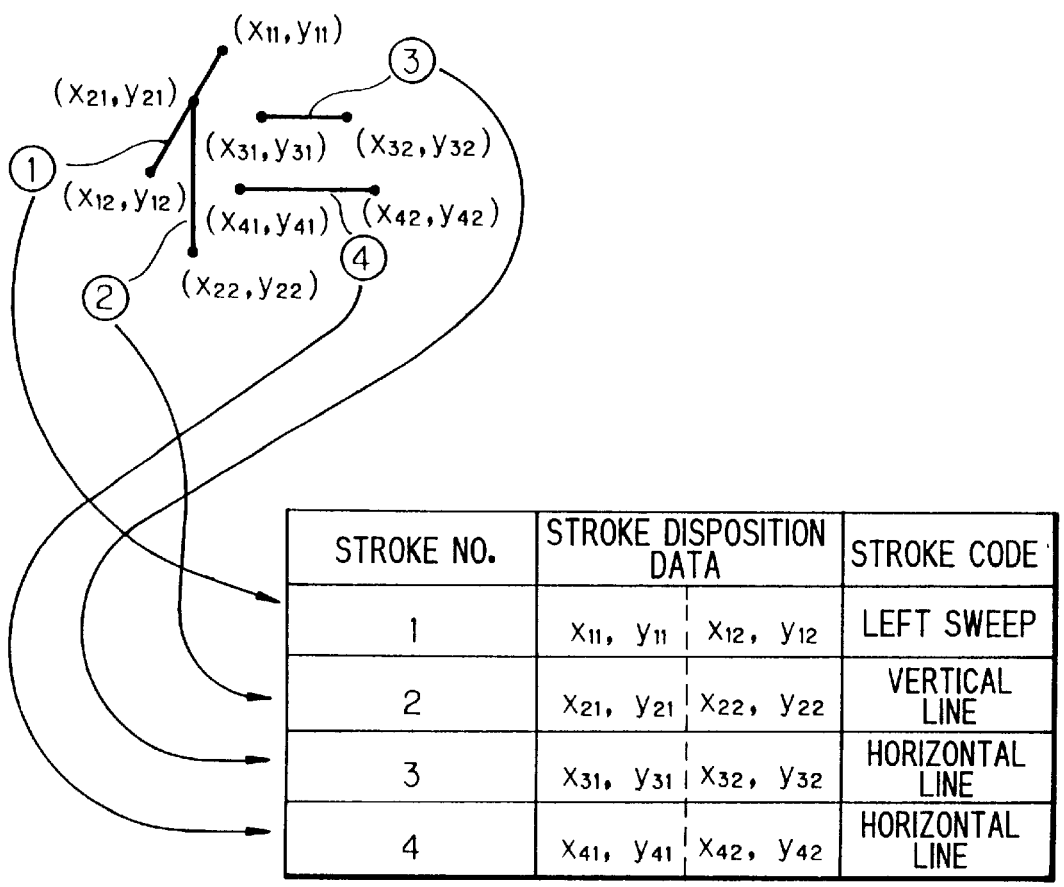
FIG. 38 is a diagram for describing basic stroke information.
Figure 39A:
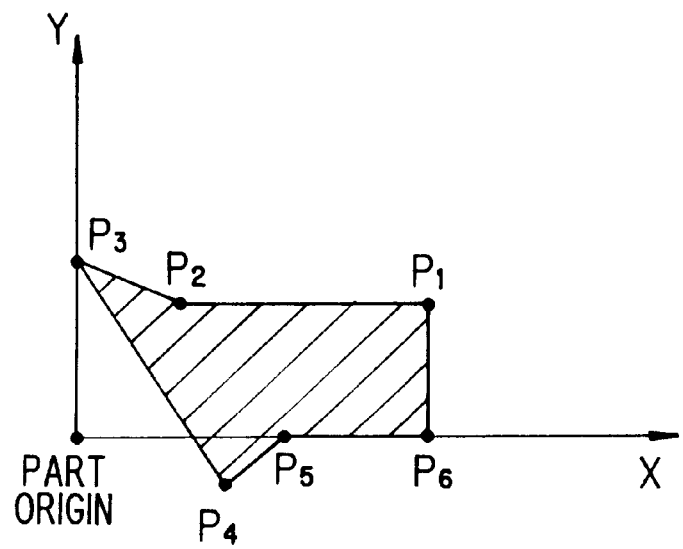
FIGS. 39A, 39B are diagrams for describing part coordinates.
Figure 39B:
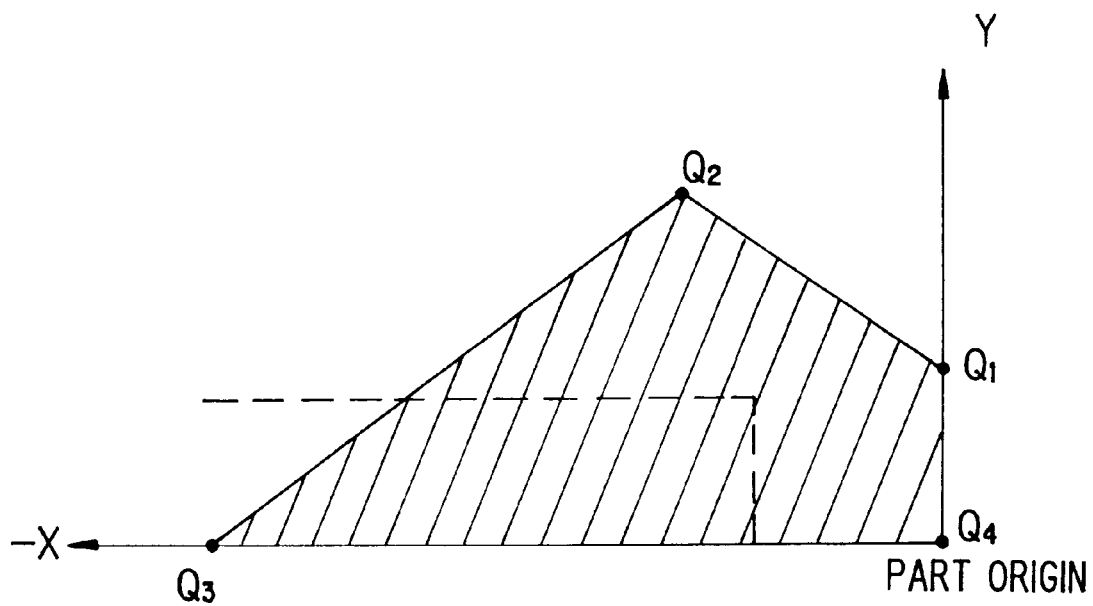
Figure 40:
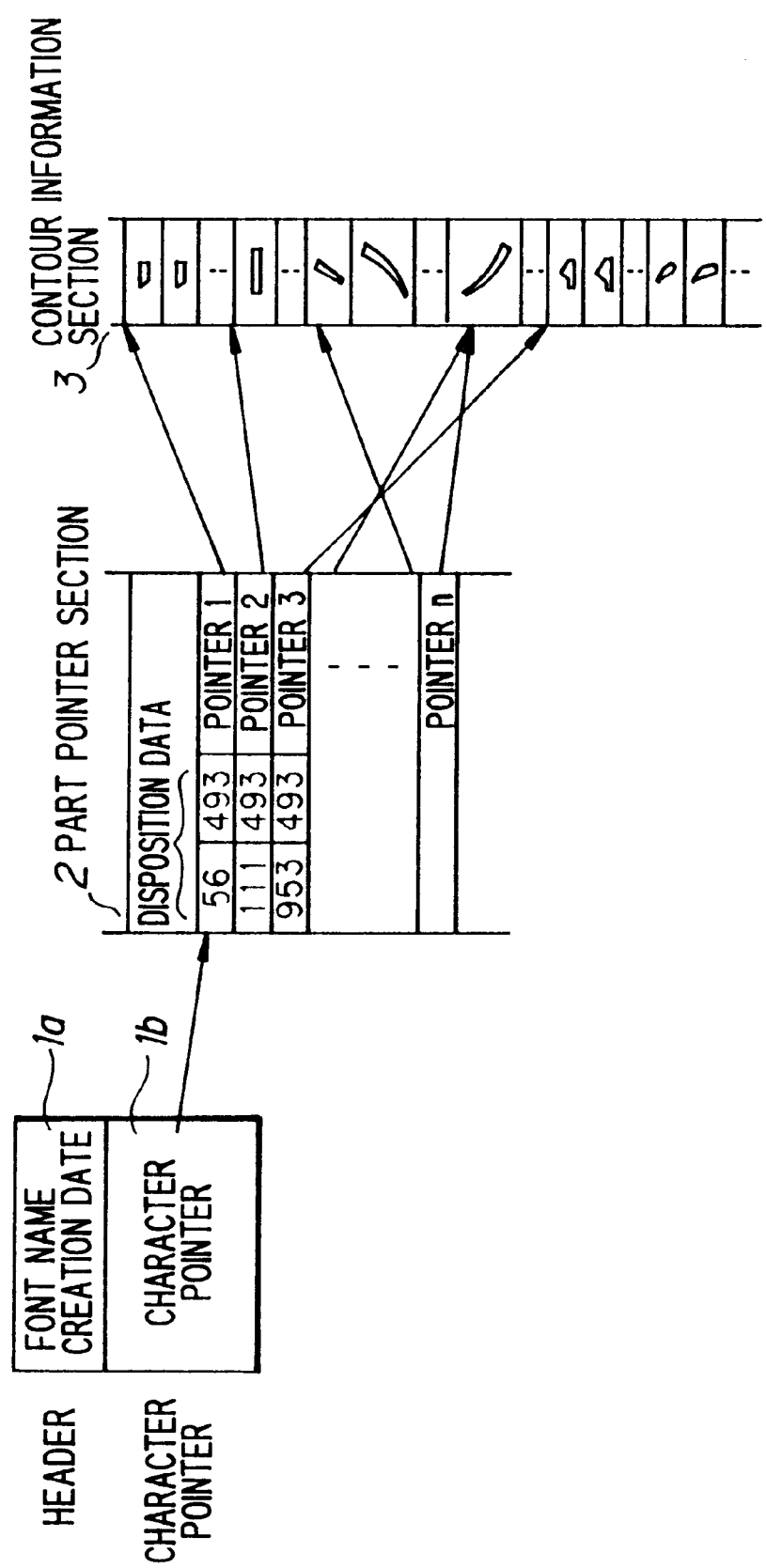
FIG. 40 is a diagram for describing the structure of a font file.
Figure 41A:
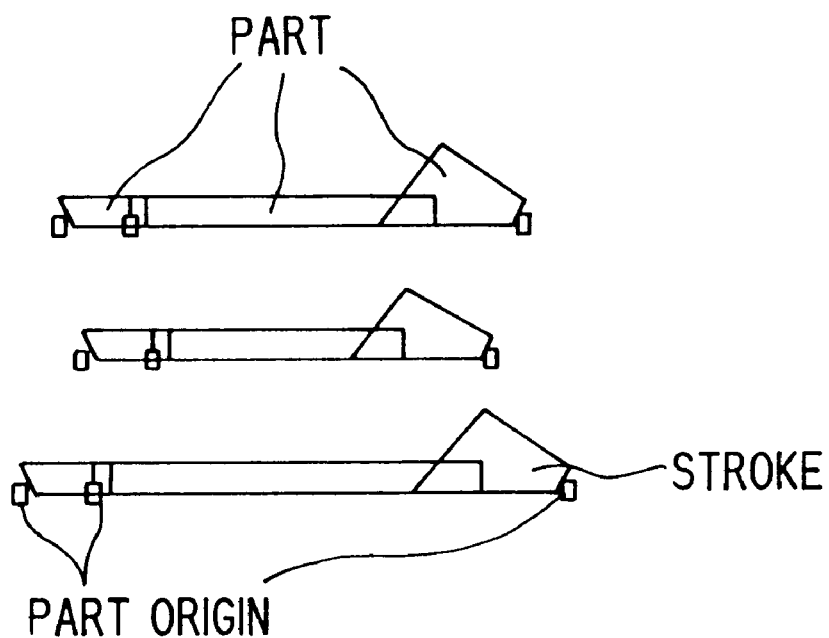
FIGS. 41A, 41B are diagrams for describing part origins.
Figure 41B:
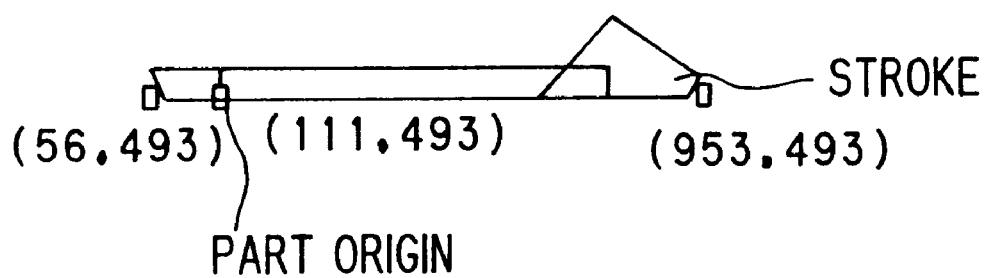
Figure 42A:
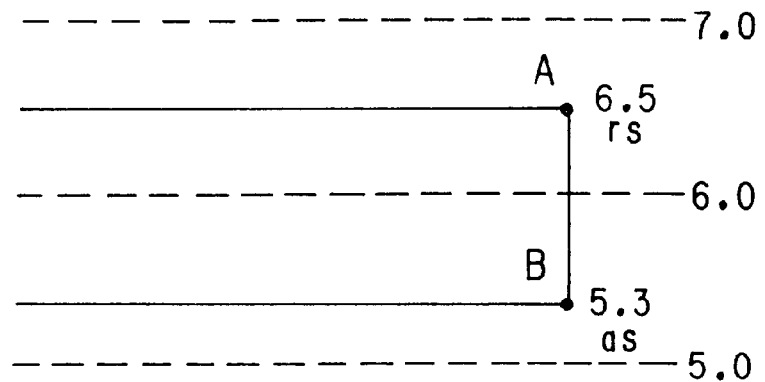
FIGS. 42A through 42C are diagrams for describing a stem hint.
Figure 42B:
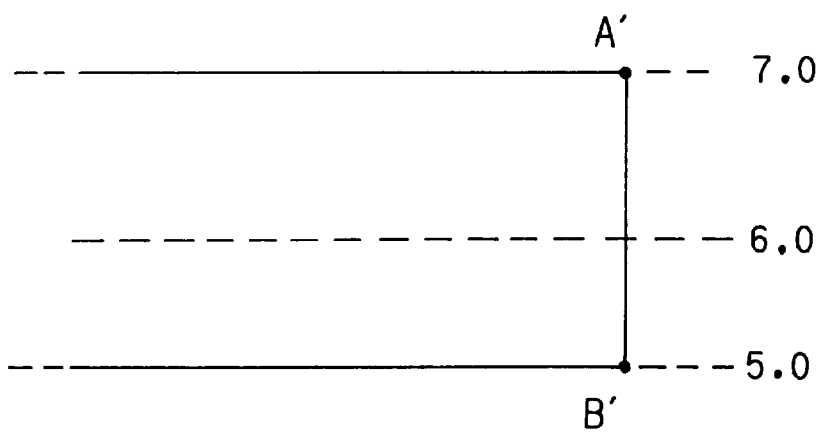
Figure 42C:
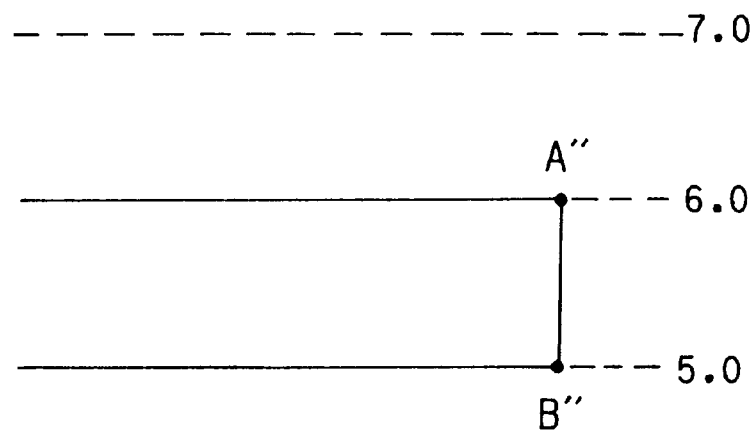
Figure 43A:
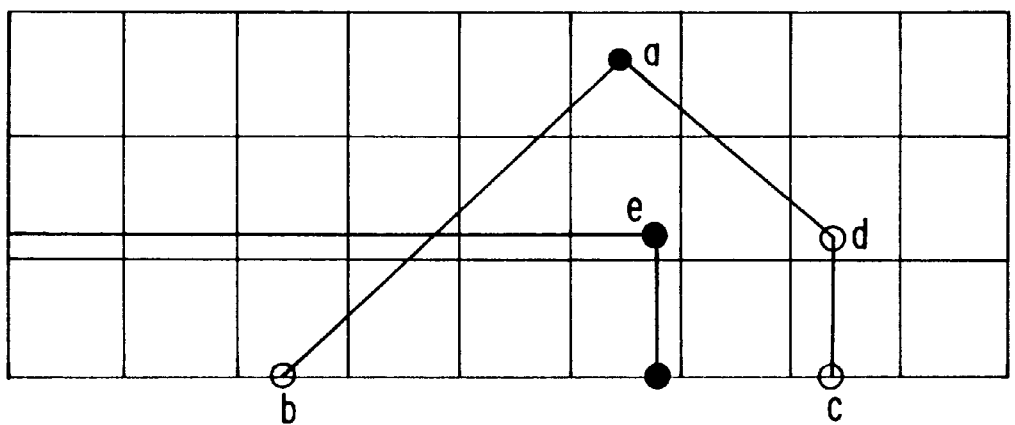
FIGS. 43A through 43C are diagrams (part 1) for describing a scale hint.
Figure 43B:
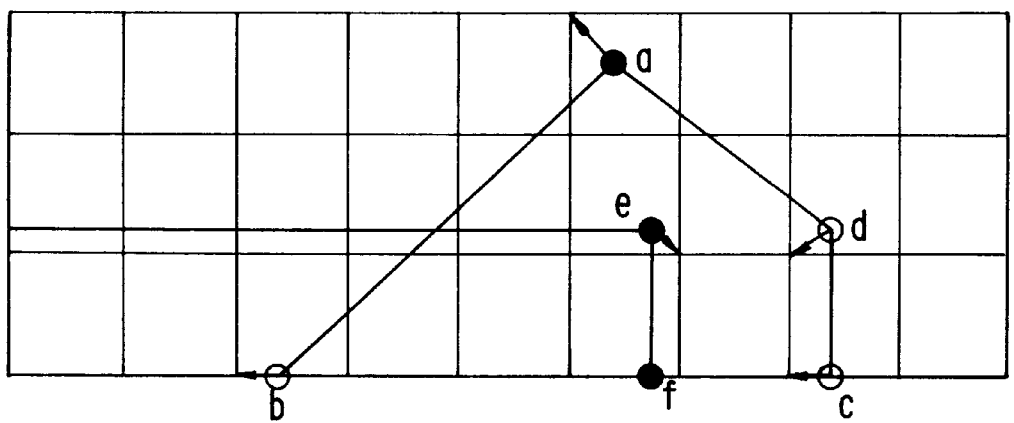
Figure 43C:
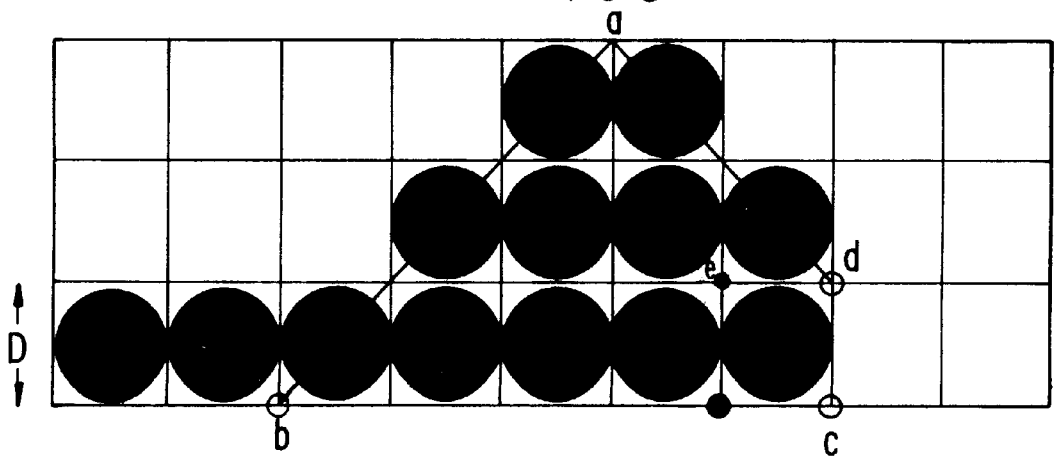
Figure 44A:
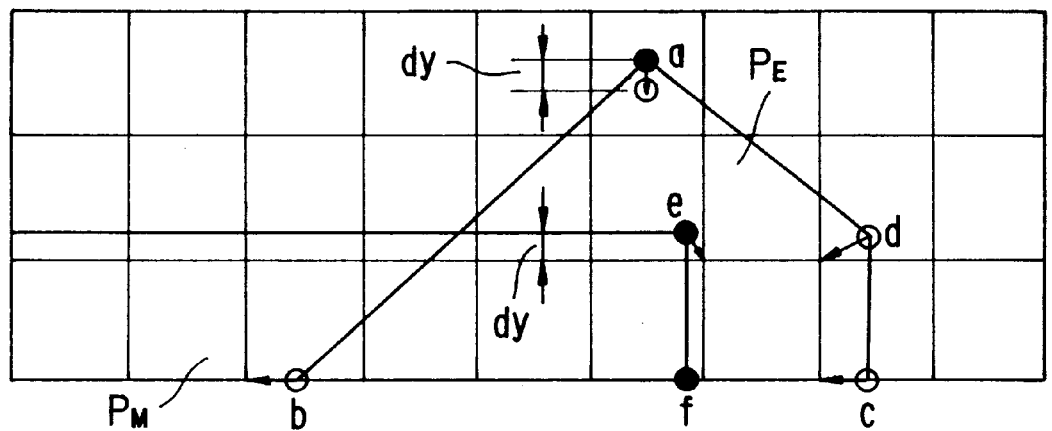
FIGS. 44A through 44C are diagrams (part 2) for describing a scale hint.
Figure 44B:
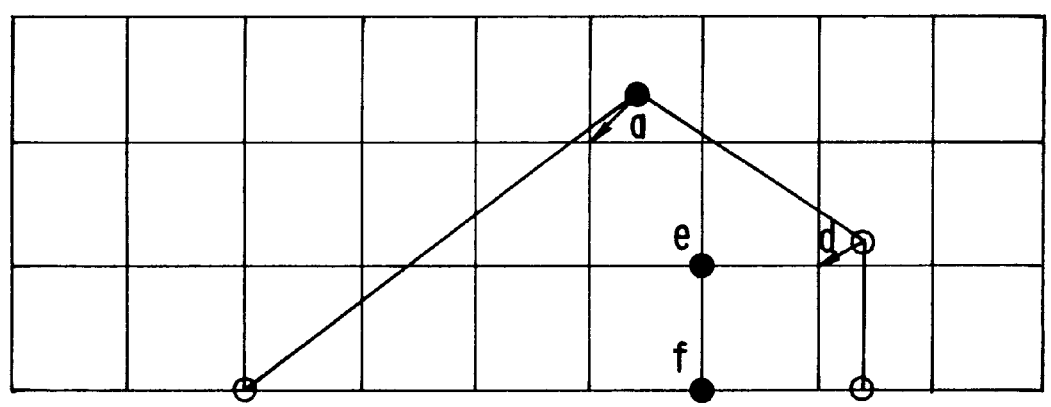
Figure 44C:
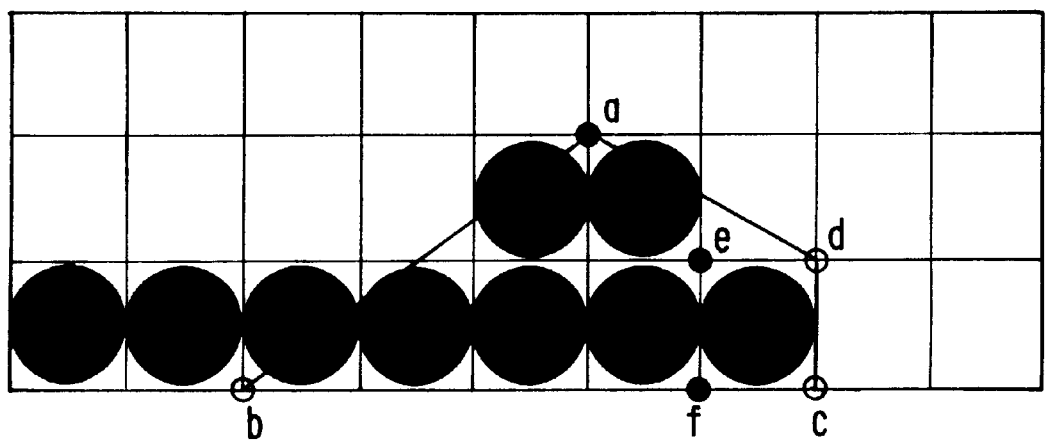

FIG. 32 is a diagram for describing the structure of control data, and FIG. 33 is a diagram for describing the outline of a part (the "teardrop" portion of a kanji character).

One item of control data is provided to correspond to the contour of an outline, and the number of items of control data provided overall is equivalent to the number of contour points. The control data is expressed by eight bits, of which (1) 0th~2nd bits indicate the dx-/dy-type, (2) the 3rd bit indicates the sign of dy, (3) the 4th bit indicates the sign of dx, (4) the 5th bit indicates whether or not there is a Y hint, (5) the 6th bit indicates whether or not there is an X hint, and (6) the 7th bit indicates whether the point is the end point of a Bézier curve.

In a case where the outline of a part is composed of contour points 0~9, as shown in FIG. 33, the 7th bit of each item of control data takes on the values shown in the bottom half of FIG. 32 on the assumption that (1) points 0, 1 are connected by a short vector, (2) points 1, 4 are connected by a first Bézier curve, (3) points 4, 7 are connected by a second Bézier curve and (4) points 7, 0 are connected by a third Bézier curve. A short vector connects points which are continuous "1"s. In a case where a "0" point resides between points of "1" and "1", a Bézier curve is generated to connect them using the "1" points and the starting and end points.

Hint information

Assume that a y mark hint, an x mark hint, a y curve hint and an x curve hint are assigned to contour points 0, 1, 4 and 7, respectively, in FIG. 33. Under this assumption, "1" indicating the presence of the y hint is entered in the 3rd bit of each of points 0, 4 of the control data, and "1" indicating the presence of the x hint is entered in the 4th bit of each of points 1, 7 of the control data. The types of the x and y hints are described in the hint-type list. Accordingly, if the hint-type list (see FIG. 30) indicated by the hint offset HOF is read, it is possible to recognize, based upon the hint-type list, that it is necessary to apply the y hint mark to point 0, the x mark hint to point 1, the y curve hint to point 4 and the x curve hint to point 7.

(g) Part conditions constituting part group

The following conditions are required of parts constructing a part group in the font file:

(1) the numbers of contour points of the part outlines are the same;
(2) the types of short-vector condensation are the same; and
(3) the hint types are the same.

In other words, a part group is constructed by classifying parts into a part group that satisfies these conditions.

(h) Control of generation of part outlines by character codes

If, when a font file is constructed as set forth above, a character code is given, the character header position conforming to the character code is recognized from the character coding directory 63 and the character header is read out. The character header 64 has the part group offset PGO, which indicates the position of a group to which each part constructing the character belongs, and the part outline index POI, which indicates the outline block position of the part in the group. Accordingly, the storage location of part outline information is made clear by the data PGO, POI, and outline information is read out of this location. In this case, outline information can be read correctly by upon referring to the control data. Moreover, hints can be assigned to contour points based upon the hint information contained in the control data. In addition, short vectors and Bézier curves are generated by referring to the read outline data and the 7th bit (which is indicative of the short vector or Bézier curve) of the control data, and an outline conforming to the part is generated by performing hint control.

The foregoing describes a case in which the present invention is applied to the assignment of hints to kanji and to a method of constructing a kanji font file. However, the invention can be applied also to the hinting and font-file construction of other characters, such as the Hankul alphabet.

(E) Effects (a) Effects of hint assignment

Thus, in accordance with the present invention, character elements whose shapes are similar and to which identical hint information is assigned are divided into classes automatically, a hint is assigned solely to the master element of each class by operator operation and the system is made to learn the assignment of the hint. The system subsequently assigns hints to the other elements automatically. As a result, hints can be assigned to character elements such as strokes or parts semi-automatically in a highly efficient manner.

Further, in accordance with the present invention, an angle of 360° is divided up into a plurality of directional ranges. If the length of a vector connecting adjacent points among the contour points specifying the outline of an element is greater than a set length and the direction of this vector is different from that of the previous vector, then the number of attributes is counted up, this vector is adopted as an attribute segment and its direction, starting point and end point are stored in memory. If the length of the vector is less than the set length, then this vector is neglected. If the length of a vector is greater than the set length but its direction is the same as that of the previous vector, the end point of the previous attribute vector is updated to the end point of the current vector. This processing is executed with regard to all vectors to create a stroke attribute list. When the numbers of attributes of two elements are the same and the arrays of direction data of the attribute segments are the same, the two elements are placed in the same class. As a result, classification can be performed automatically in efficient fashion.

Furthermore, in accordance with the present invention, when a hint is assigned to a master element in each class in a learning step, a best matching master element, namely the master element that most closely resembles a target master element, is obtained from master elements to which hints have already been assigned. A hint is assigned to the target master element by using the hint information of the best matching master element. Thereafter, hint editing is performed on the display screen and hints are assigned to the target master element. As a result, the learning of hint assignment can be performed efficiently.

Further, in accordance with the present invention, extremal points are found on the outline of a master element, to which a hint has been assigned, and on the outline of a target master element. The extremal points are points at which the coordinate values in the X and Y directions undergo a change from a decreasing tendency to an increasing tendency or from an increasing tendency to a decreasing tendency. Among the extremal points along the X axis, an extremal point whose coordinate changes from an increasing value to a decreasing value is represented by Xmax and an extremal point whose coordinate changes from a decreasing value to an increasing value is represented by Xmin. Among the extremal points along the Y axis, an extremal point whose coordinate changes from an increasing value to a decreasing value is represented by Ymax and an extremal point whose coordinate changes from a decreasing value to an increasing value is represented by Ymin. The array Xmax, Xmin, Ymax, Ymin that appears along the outline of a stroke is obtained. A master element to which a hint has already been assigned, and whose number of extremal points along the X and Y axes is the same as that of the target master element and, moreover, whose array of extremal points is the same, is obtained. Scaling is performed in such a manner that the size of the obtained master element, to which a hint has been assigned, along the X and Y axes thereof will coincide with size of the target master stroke along the X and Y axes thereof, or vice versa. Following scaling, the degree of similarity between the two master elements is determined based upon the area overlap between the two master elements. The master element to which a hint has been assigned and which exhibits the highest degree of similarity is adopted as the best matching master element. As a result, the best matching master stroke can be obtained automatically and the learning of hint assignment can be performed efficiently.

Furthermore, in accordance with the present invention, single corresponding points on a master element, to which a hint has been assigned, and on the target master element, and single segments having these corresponding points as their end points are superimposed, and the interior of each element is scanned along scanning lines having a predetermined spacing. The lengths of the scanning lines within each of the elements are summed and the sum of the line lengths in each element is adopted as the area of the element. Further, the lengths of the scanning lines in the overlapping portions of the master elements are summed and the sum is adopted as the area of overlap. The area of overlap is divided by the sum of the areas of the two master elements. The value obtained is adopted as the degree of similarity. Accordingly, the degree of similarity can be obtained comparatively simply and with good accuracy.

Further, in the step of assigning hints automatically, individual attribute segments of the target element or master element are scaled in such a manner that the starting and end points of the attribute segments of the target element and of the attribute segments of the master element will overlap, the coordinates of contour points of the target element or master element residing between the starting and end points of each attribute segment are scaled in a similar manner, the contour point on the target element nearest the hint position of the master element is obtained and hint information at this hint position is applied to the above-mentioned contour point. As a result, hints can be assigned to each character element automatically after learning.

(b) Effects of the method of constructing a font file

In accordance with the present invention, parts of similar shape are divided into groups and a font file is so constructed that data capable of being shared by the parts in the group need only be prepared singly for the group. This makes it possible to reduce the size of the font file and, hence, reduce the amount of memory capacity used.

Further, in accordance with the present invention, the type of vector connecting adjacent points among contour points specifying the outline of a part is classified based upon the direction and length of the vector, data lengths necessary for expressing vectors of various types are decided, and the type of each vector constructing the outline of a part is described in the shared-data portion of a group header. Accordingly, each vector can be expressed in a proper data length conforming to direction and vector length of the vector. As a result, the size of the font file can be decreased (the outline data can be condensed). Moreover, the data length of each vector can be recognized from the type described in the shared-data portion when the outline data are read, and the outline information can be read out correctly.

Furthermore, in accordance with the present invention, a hint table in which a hint-type list is described for every group is provided, and a hint offset indicating the position of a hint-type list within the hint table is described in the shared-data portion of the group header. As a result, a hint-type list is read out based upon the hint offset and hint information can be added onto the outline of a part. Moreover, since it suffices to provide only one hint-type list per group, the font file can be made small in size.

Further, in accordance with the present invention, hint position data specifying the positions of contour points of an outline to which information is assigned are described in the shared-data portion of a part group. As a result, hint type specified by the hint-type list is added onto the contour points indicated by the hint position data, and hints can be assigned automatically.

Furthermore, in accordance with the present invention, the block length of part outline data is described in the shared-data portion of the group header. As a result, the outline data of a desired part can be read out at high speed from a part outline index and block length, where the part outline index specifies the outline block number in the part group of the part of interest.

As many apparently widely different embodiments of the present invention can be made without departing from the spirit and scope thereof, it is to be understood that the invention is not limited to the specific embodiments thereof except as defined in the appended claims.

What is claimed is:

1. A method of assigning hints for outline-font creation, the method comprising:

dividing a plurality of character elements into classes of elements having similar outlines;

learning hint assignments by storing hint information input by an operator for a master element of each class, the hint information indicating a hint and a predetermined position of an outline of the master element; and assigning hint information for each class to elements of the class, using the learned hint information of the master element of the class.

2. The method according to claim 1, wherein dividing the character elements includes:

dividing an angle of 360° into a plurality of directional ranges;

if the length of a current vector connecting adjacent points among contour points specifying the outline of an element of interest is greater than a set length and if a direction of the current vector is different from a direction of a previous vector, then counting up a number of attributes from an initial number equal to zero and storing the direction, a starting point and an end point of the vector as an attribute segment;

neglecting the current vector if the length thereof is less than the set length;

updating an end point of an attribute segment of the previous vector to the end point of the current vector if the length of the current vector is greater than the set length and the direction of the current vector matches a direction of the previous vector;

creating an attribute list comprising an attribute segment for each vector of the element; and if the respective numbers of attributes of two elements are equal and respective arrays of direction data of the attribute segments match, then placing the two elements in the same class.

3. The method according to claim 1, wherein learning the hint assignments includes:

when a hint is assigned to a master element of each class, obtaining a best matching master element which, among the master elements to which hints have been assigned, most resembles a master element of interest;

assigning a hint to the master element of interest using the hint information of the best matching master element; and performing hint editing on a display screen to correct hints assigned to the master element of interest.

4. The method according to claim 3, wherein obtaining the best matching master element includes:

obtaining extremal points on an outline of the master element to which a hint has been assigned and on an outline of the master element of interest, each extremal point being one of a minimal point and a maximal point of a coordinate value along one of an X axis and a Y axis;

obtaining an array of values Xmax, Xmin, Ymax, Ymin for each of the outlines, where Xmax represents a maximal point along the X-axis, Xmin represents a minimal point along the X-axis, Ymax represents a maximal point along the Y-axis, and Ymin represents a minimal point along the Y axis;

obtaining a master element to which a hint has already been assigned, and whose number of extremal points along the each of the X-axis and the Y-axis equal to the corresponding number of extremal points of the master element of interest and whose array of extremal points matches the array of extremal points of the master element of interest;

performing scaling to coincide a size of the obtained master element along each of the X and Y axes thereof with a size of the master element of interest along the X and Y axes thereof;

obtaining a degree of similarity between the two master elements based upon an area of overlap between the two master elements after scaling; and adopting the obtained master element as a best matching master element when the obtained master element exhibits a highest degree of similarity.

5. The method according to claim 4, wherein obtaining the degree of similarity includes:

superimposing single corresponding points located on the obtained master element and on the master element of interest, and superimposing single segments having respective pairs of the corresponding points as end points thereof;

when scanning along scanning lines having a predetermined spacing has been performed, summing lengths of the scanning lines within each of the two master elements, adopting a sum of the line lengths in each master element as the area of the master element, and summing lengths of the scanning lines in overlapping portions of the two master elements and adopting a resulting sum as the area of overlap;

dividing the area of overlap by a sum of the areas of the two master elements and adopting a resulting quotient as the degree of similarity.

6. The method according to claim 2, wherein assigning the hint information includes:

scaling individual attribute segments of one of the element of interest and the master element of the class to overlap the respective starting and end points of the attribute segments of the element of interest and the attribute segments of the master element, and scaling coordinates of contour points of one of the element of interest and the master element residing between the starting and end points of each attribute segment;

obtaining a contour point on the element of interest nearest the hint position of the master element; and applying hint information at the hint position to the obtained contour point.

7. A font-file construction method for outline-font creation, the method comprising:

dividing a collection of parts into groups of parts having similar shapes, the collection of parts corresponding to a character and each part being cut from a corresponding single stroke of the character;

constructing a part-group data section including a part group for each of one or more of the groups, each part group including a header for recording data common to each part in the group and for each part in the group a part-outline block describing an outline of the part; and constructing a font file from a character code to obtain, for each part, data specifying a position in a part-group data section of a part group to which the part belongs and data specifying a position of a part-outline block of the part in the part group.

8. The method according to claim 7, wherein the part-outline blocks of each part group are arranged in decreasing order of rate of utilization.

9. The method according to claim 7, wherein:

for each part group the common data includes a block length common to each of the part-outline blocks of the part group;

for each of the part-outline blocks the data specifying the location of the part-outline block includes a block number; and a font file is constructed by obtaining a part-outline block position for a specified part from a corresponding block length and block number.

10. The method according to claim 7, wherein:

a vector connecting adjacent points among contour points specifying the outline of a part is classified by vector type according to whether the vector is horizontal, vertical or oblique and according to a length of the vector;

data lengths necessary for expressing each axial component of vectors of respective vector types are determined; and the common data for each group of parts includes control data describing a vector type of each vector constructing an outline of a part of the group.

11. The method according to claim 10, wherein a font file is constructed for reading out outline information upon recognizing breaks in vector data of each vector and constructing an outline of a part based upon the vector type of each vector obtained from the control data.

12. The method according to claim 7, wherein a font file is provided with a hint table having, for each group, a hint-type list describing a type of hint information assigned commonly to the outline of each part within the group, the common data having hint offset data indicating a position of the hint-type list within the hint table.

13. The method according to claim 12, wherein the common data includes hint position data specifying a contour-point position on an outline to which the hint information is assigned.

14. The method according to claim 13, wherein:

a font file is constructed for reading out a hint-type list based upon the hint offset data; and hint information obtained from the hint-type list can be assigned to an outline contour point of a part indicated by the hint position data.

15. An outline-font creation apparatus, comprising:

a classification unit that divides a plurality of elements comprising a character into a plurality of classes, each element corresponding to one of the classes; and an assignment unit that, for each class, assigns hint information to each element of the class, the assigned hint information corresponding to learned hint information provided for a master element of the class.

16. The apparatus of claim 15, further comprising a learning unit that receives position information and hint type information input to said apparatus for a specified master element and stores the received information to a character information storage.

17. The apparatus of claim 15, wherein the plurality of elements comprises a plurality of strokes.

18. The apparatus of claim 15, wherein the plurality of elements comprises a plurality of parts.

19. An outline-font creation method, comprising:

dividing a plurality of elements comprising a character into a plurality of classes, each element corresponding to one of the classes; and for each class, assigning hint information to each element of the class, the assigned hint information corresponding to learned hint information provided for a master element of the class.

20. A method according to claim 19, further comprising:

receiving position information and hint type information for a specified master element; and storing the received information to a character information storage.

21. A computer-readable medium encoded with a program for outline-font creation, said program comprising comprising:

dividing a plurality of elements comprising a character into a plurality of classes, each element corresponding to one of the classes; and for each class, assigning hint information to each element of the class, the assigned hint information corresponding to learned hint information provided for a master element of the class.

* * * * *